US 12,050,163 B2

(12) United States Patent
Mccampbell et al.

(10) Patent No.: US 12,050,163 B2
(45) Date of Patent: Jul. 30, 2024

(54) DEPARAFFINIZATION OF TISSUE UTILIZING ELECTRIC FIELD

(71) Applicant: Agilent Technologies, Inc., Santa Clara, CA (US)

(72) Inventors: Adrienne Mccampbell, San Jose, CA (US); Victor Lim, Pacifica, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/976,610

(22) Filed: Oct. 28, 2022

(65) Prior Publication Data

US 2023/0053368 A1    Feb. 23, 2023

Related U.S. Application Data

(63) Continuation of application No. 16/392,532, filed on Apr. 23, 2019, now Pat. No. 11,525,759.

(60) Provisional application No. 62/661,815, filed on Apr. 24, 2018.

(51) Int. Cl.
  *G01N 1/40* (2006.01)
  *G01N 1/44* (2006.01)
  *G02B 21/34* (2006.01)

(52) U.S. Cl.
  CPC ............. *G01N 1/40* (2013.01); *G01N 1/4022* (2013.01); *G01N 1/44* (2013.01); *G01N 2001/4038* (2013.01); *G02B 21/34* (2013.01)

(58) Field of Classification Search
  CPC .......... G01N 1/40; G01N 1/4022; G01N 1/44; G01N 1/34; G01N 1/36; G01N 2011/4038; G02B 21/34
  See application file for complete search history.

(56) References Cited

U.S. PATENT DOCUMENTS

| 4,034,966 A | 7/1977 | Suh et al. |
| 5,817,032 A | 10/1998 | Williamson et al. |
| 6,055,453 A | 4/2000 | Hofmann et al. |
| 6,544,798 B1 | 4/2003 | Christensen et al. |

(Continued)

FOREIGN PATENT DOCUMENTS

| EP | 3086730 A1 | 11/2016 |
| JP | 2014045689 A | 3/2014 |

(Continued)

OTHER PUBLICATIONS

Banerjee, S K. et al., "Microwave-Based DNA Extraction From Paraffin-Embedded Tissue For PCR Amplification," Biotechniques, Informa Healthcare, vol. 18, No. 5, May 1, 1995, 4 pages.

(Continued)

*Primary Examiner* — Brian R Gordon
*Assistant Examiner* — Dwan A Gerido

(57) ABSTRACT

Paraffin-embedded tissue is prepared removing paraffin from the tissue. The paraffin is removed by generating an electric field effective to produce plasma and direct charged species of the plasma to the paraffin, thereby rendering the paraffin responsive to the electric field. The electric field may move the paraffin out from the tissue due to electrostatic force. Movement of the paraffin may be assisted by moving an electrode utilized to generate the electric field relative to the paraffin. Movement of the paraffin also may be assisted by applying a solvent and/or heat energy to the tissue.

15 Claims, 7 Drawing Sheets

(56) References Cited

U.S. PATENT DOCUMENTS

| | | | |
|---|---|---|---|
| 7,235,140 | B1 | 6/2007 | Hayes et al. |
| 10,613,005 | B2* | 4/2020 | Lim ................ G01N 1/312 |
| 11,525,759 | B2* | 12/2022 | Mccampbell ............ G01N 1/34 |
| 2002/0166769 | A1 | 11/2002 | Serikov |
| 2003/0116281 | A1 | 6/2003 | Herbert et al. |
| 2003/0124729 | A1 | 7/2003 | Christensen et al. |
| 2005/0220674 | A1 | 10/2005 | Shafirstein et al. |
| 2008/0138374 | A1 | 6/2008 | Storey et al. |
| 2013/0309688 | A1 | 11/2013 | Barker et al. |
| 2014/0024024 | A1 | 1/2014 | Sood et al. |
| 2014/0051118 | A1 | 2/2014 | Matthiesen et al. |
| 2015/0284709 | A1 | 10/2015 | Laugharn, Jr. et al. |
| 2018/0120207 | A1 | 5/2018 | Lim et al. |

FOREIGN PATENT DOCUMENTS

| | | |
|---|---|---|
| WO | 2007030373 A2 | 3/2007 |
| WO | 2018081693 A1 | 5/2018 |

OTHER PUBLICATIONS

Belkind, A. et al., "Plasma Cleaning of Surfaces," Vacuum Technology & Coating, 2008, 1-11.

EPO, "Extended European Search Report mailed on Jun. 4, 2020," Application No. 17865336.6, 6 pages.

Fujishima, Satoshi et al., "Novel Method For Rapid Fluorescence In-Situ Hybridization Of ALK Rearrangement Using Non-Contact Alternating Current Electric Field Mixing," Scientific Reports, vol. 7, Article No. 15116, Nov. 8, 2017, 1-7.

Imai, Kazuhiro et al., "Development Of A Novel One-Step Automated Rapid In Situ Hybridization For Anaplastic Lymphoma Kinase Rearrangement Using Non-Contact Alternating-Current Electric-Field Mixing," Pathobiology, vol. 87, Feb. 5, 2020, 45-50.

Lin, Jianghai et al., "High-Quality Genomic Dna Extraction From Formalin-Fixed And Paraffin-Embedded Samples Deparaffinized Using Mineral Oil," Analytical Biochemistry 395, 2009, 265-267.

PCT, "International Search Report and Written Opinion mailed on Feb. 9, 2018," Application No. PCT/US2017/058999, 15 pages.

PCT, "Notification of Transmittal of The International Search Report & Written Opinion mailed on Nov. 18, 2021," Application No. PCT/US2021/044011, 10 pages.

Saito, Yoshitaro et al., "Novel Method For Rapid In-Situ Hybridization Of HER2 Using Non-Contact Alternating-Current Electric-Field Mixing," Scientific Reports, vol. 6, Article No. 30034, Jul. 22, 2016, 1-8.

Samigullin, A D. et al., "Study Of The Petroleum Schedules Thermal Cleaning Process From Asphalt, Ressin And Paraffin Deposits Using Low-Temperature Plasma," Journal of Physics, Conference Series 669, 2016, 4 pages.

Smith, Mark D. et al., "Plasma Cleaning End-Of-Process Detection," The Department of Energy Weapons Complex, Annual Adhesives Conference, Jun. 5-6, 1979, 1-13.

Agilent Pathology Solutions, et al., "Dako Omnis Brochure," Product Information, 12 pages.

Agilent Pathology Solutions, et al., "Staining Solutions Brochure," Product Information, Dako Staining Solutions for H&E, Special Stains, IHC and ISH, 16 pages.

Agilent Technologies, et al., "Dako Coverslipper Flyer," Product Information, 2019, 2 pages.

Agilent Technologies, et al., "HRP Magenta Chromogen for Dako Omnis," Product Information, 2018, 8 pages.

Gutsol, A. F. et al., "Electro-Hydrodynamic And Plasma Phenomena In Corona-Liquid Interaction," 19th IEEE Pulsed Power Conference (PPC), San Francisco, Jun. 2013, 6 pages.

* cited by examiner

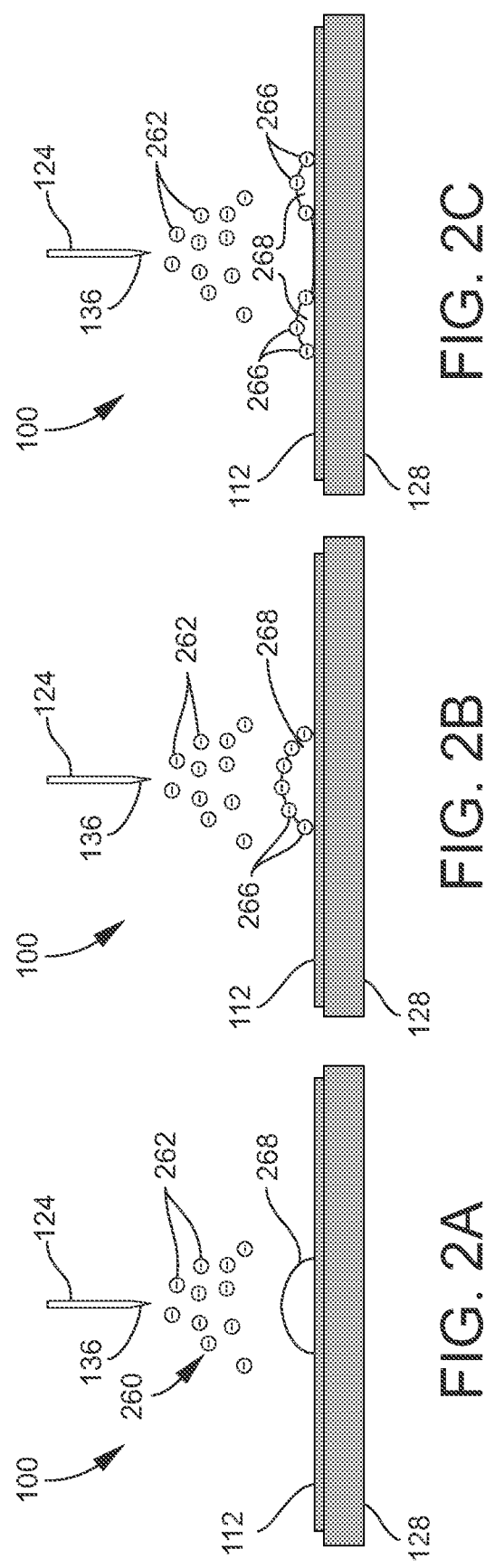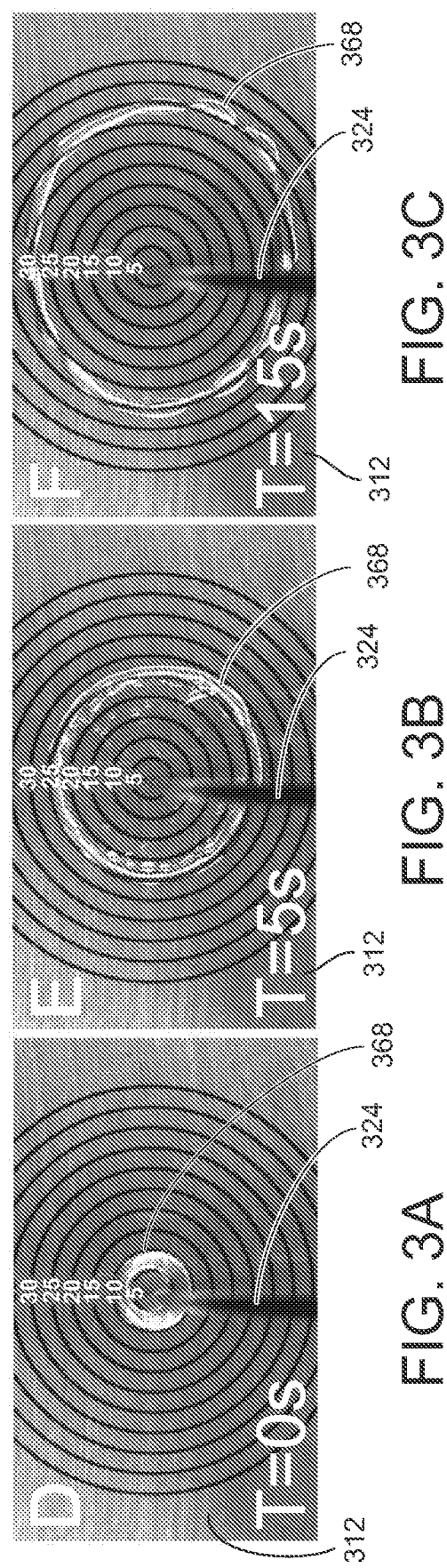

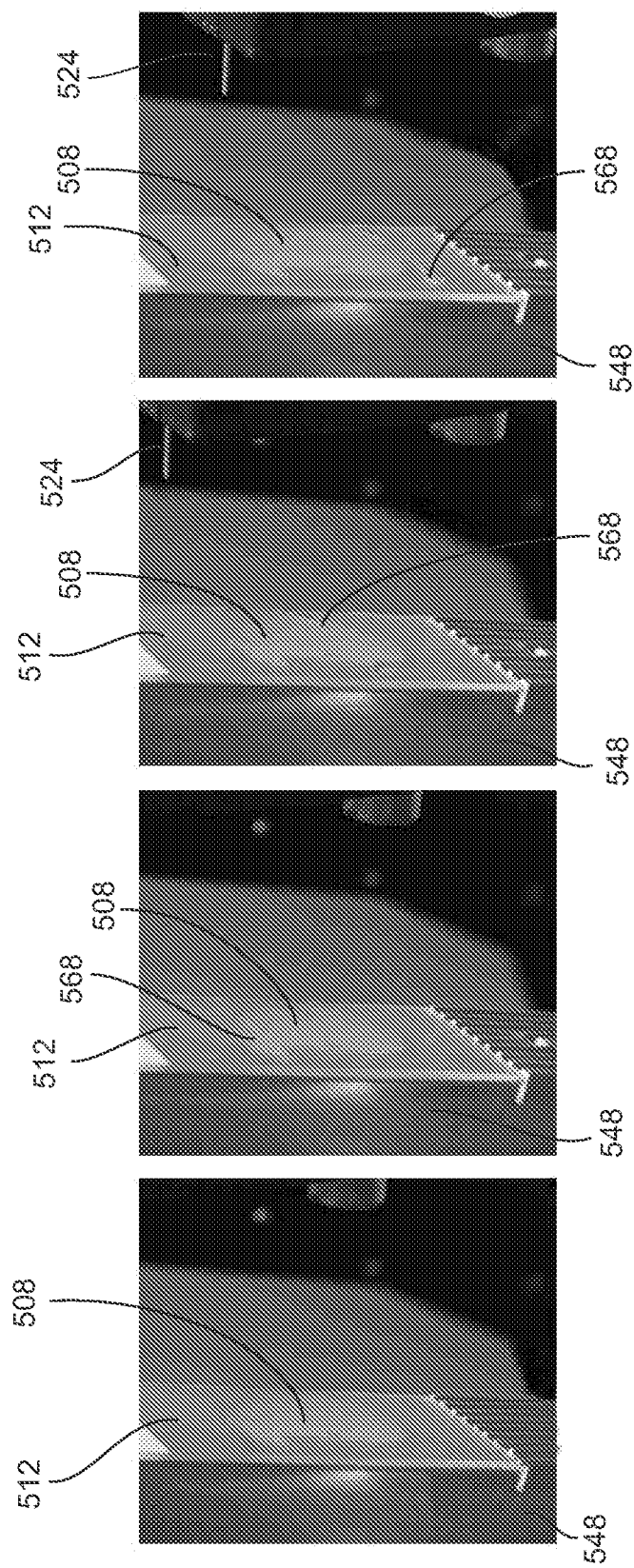

DEPARAFFINIZATION OF TISSUE UTILIZING ELECTRIC FIELD

RELATED APPLICATIONS

This application is a continuation of U.S. Non-provisional patent application Ser. No. 16/392,532, filed Apr. 23, 2019, which claims the benefit under 35 U.S.C. § 119(e) of U.S. Provisional Patent Application Ser. No. 62/661,815, filed Apr. 24, 2018, titled "DEPARAFFINIZATION OF TISSUE UTILIZING ELECTRIC FIELD," the content of which is incorporated by reference herein in its entirety.

TECHNICAL FIELD

The present invention generally relates to the removal of paraffin from paraffin-embedded tissue, such as may be performed, for example, in preparation for staining tissue for microscopic study. More particularly, the invention relates to the removal of paraffin utilizing an electric field-based modality by which electrical charge is imparted to the paraffin to be removed.

BACKGROUND

In histology and related fields (e.g., histopathology), a biological specimen such as cellular tissue is collected from a human or animal and then subjected to various processing steps in preparation for being stored for a potentially long period of time and subsequently examined by an analytical instrument such as a light microscope or electron microscope. A typical preparative process may entail fixing, processing (dehydration and stiffener infiltration), embedding, sectioning, drying, and staining.

As an example, a biopsy or surgical procedure is performed to collect tissue for subsequent study. The collected tissue is then placed in a tissue jar containing a chemical fixative such as formalin to stop the natural degradation process. Fixatives crosslink proteins to thereby destroy the functionality of enzymes that degrade tissue. The tissue jar is then transported to a laboratory for further processing. At this time, information regarding the tissue may be entered into a laboratory information system (LIS) and the tissue may be given an identification number.

Next, the tissue sample is sent for grossing. A technician (e.g., a pathologist or other appropriately trained person such as a pathology resident or a histology technician) examines the tissue as it was received. The technician may note the size, condition, and any remarkable features of the tissue, and verbally record observations that are later entered into the LIS. The technician then selects appropriate portion(s) of the tissue for histological examination. The tissue portion(s) are cut to a size that fits easily within tissue cassette(s) and preferably smaller than that. The tissue portion(s) are placed loosely into a tissue cassette that is labeled with a barcode containing information associated with the tissue, and the tissue cassette is closed to secure the tissue therein. A typical tissue cassette has outer dimensions of about 28.5×41×6.7 millimeters (mm), a hinged lid, and flow-through slots or holes to allow the tissue to be immersed in liquid while remaining securely contained inside the tissue cassette. The tissue cassette may then be immersed in a fixative bath for several hours.

The tissue sample is then subjected to processing, which may be automated using a suitable processing apparatus. The entire goal of processing is to completely dehydrate the tissue so that the tissue can be infiltrated with paraffin to make it stiff enough to cut later. The tissue is immersed in alcohol baths of successively increasing alcohol concentrations, for example a 70% ethanol bath for fifteen minutes, followed by a 90% ethanol bath for fifteen minutes, followed by a series of 100% ethanol baths for longer times. Some processors include microwave or acoustic methods to speed up the exchange. Next, the dehydrated tissue is immersed in a xylene (or other clearing agent) bath for twenty minutes to an hour to completely remove the alcohol, as the alcohol is immiscible with paraffin. The last step of processing is to infiltrate the tissue with melted paraffin (usually at about 60° C.) and then cool the tissue and paraffin to room temperature.

The technician then collects all of the closed, barcoded tissue cassettes containing the tissues and brings them to an embedding station. The embedding station includes a hot melt gun containing melted paraffin and a chill plate. The technician opens one cassette and selects a mold that will comfortably fit the tissue inside the tissue cassette. The technician places a small amount of paraffin in the base of the mold, and then arranges the tissue in the mold as the paraffin solidifies on the chill plate. Orientation of the tissue matters at this point, as the tissue closest to the bottom of the mold will be the tissue that is first cut by a microtome. The technician then fills the rest of the mold with melted paraffin. Next, the technician places the backside of the tissue cassette against the paraffin and may add a further amount of paraffin. The tissue cassette carries the barcode information and acts at a holder for the tissue block. The technician then sets the mold aside until the paraffin hardens, and then removes the tissue block from the mold. The resulting tissue is referred to as formalin fixed paraffin embedded (FFPE) tissue.

The technician then uses a microtome to section (cut) the tissue block to obtain one or more thin slices of the stiffened tissue. Usually the thickness of these tissue slices is on the order of 4 to 6 micrometers ($\mu m$), although a range of 1 micrometer to 30 micrometers is not uncommon. For most staining protocols, the goal is to get a cross-section of the tissue that is approximately one cell thick. Genomic analysis may have different requirements depending on the amount of tumor in a section. The technician typically starts by trimming away the excess paraffin on the top of the tissue block using the microtome. Once the tissue is exposed, the technician cuts several sections, which tend to form a ribbon. The ribbon is carefully placed in a heated water bath to flatten both the paraffin and the tissue. The technician then singulates the ribbon into individual sections and draws up each section onto a glass microscope slide. At this point, each slide consists of one, two, or several sections of tissue and paraffin (both the infiltrating paraffin and the embedding paraffin) held onto the slide by surface tension from a very thin film of water. Each slide is barcoded for identification.

For most staining protocols, the tissue sections need to be carefully dried on the slide, as it is critical that the sections fully adhere to the slides. Drying typically entails air-drying the slides for about twenty minutes in a vertical orientation to allow the water to flow to the bottom of the section and then evaporate. This process puts the tissue into direct contact with the glass microscope slide. Next, the slide is baked at about 60° C. Usually the slide is placed flat on a hot plate or in a heated chamber (e.g., an oven) for about twenty minutes to an hour. There are some variants to the heating apparatus available, but all of them essentially involve the use of heated chambers or hot plates in some form. This process of drying and baking is done to ensure adhesion of the tissue to the slide throughout the staining process and potentially a decade or more of subsequent storage. Tissue that separates from the slide is lost, the consequence of which can be serious such as in the case of a patient who experienced surgery to obtain the tissue sample. Tissue adhesion to non-charged slides may be problematic, however it is routinely performed for hematoxylin and eosin (H&E) stained sections. To help with adhesion, some labs use charged slides so that the negative charges on the proteins and nucleic acids (deoxyribonucleic acid or DNA, and ribonucleic acid or RNA) of the sample interact with positively charged slides. Other labs put an adhesive in the water bath while using plain glass slides to be sure that the tissues adhere to the slides. The length of the drying and baking time varies depending on the subsequent staining process to be performed. The baking protocol is longer for slides that will be stained for immunohistochemistry (IHC) than for the standard H&E staining simply because IHC is a more aggressive chemistry and hence increases the likelihood of tissue sections falling off the slides.

After the tissue has been adhered to the slide, the tissue may be stained. There are many kinds of staining. Normally, a tissue block will have a section mounted on a slide for H&E staining. Hematoxylin stains nucleic acids blue and thus is useful as a marker of the cellular nucleus. Eosin stains proteins pink and thus is useful as a marker of cellular membranes, cytoplasm, and extracellular matrix. Pathologists use H&E stained slides to look at the morphology of the tissue structure. Often the pathologist can obtain a diagnosis from studying H&E stained slides alone and does not need any further analysis.

The first step in staining a tissue section is removing the paraffin adhered to the slide and intermixed with the tissue. The traditional sequence of steps involved in removing the paraffin is essentially the opposite of that described above. The slide is dipped in xylene or another clearing agent to dissolve the paraffin and remove it. Other solvents such as isopropyl alcohol and Clearify®™ clearing agent are also becoming popular because they are less toxic than xylene, although they do not work as well as xylene on their own. The slide is then placed into a series of ethanol solutions starting with 100% ethanol composition to remove the xylene and moving down to 70% composition to rehydrate the tissue. Then the slide is placed in deionized water.

After removing the paraffin, the slide is stained. For example, the slide may be placed into a hematoxylin solution to stain the nuclei and then rinsed. Subsequently, the slide may be placed into an eosin solution to stain the protein and then rinsed. Next, a mounting solution is placed over the stained tissue, and a thin coverslip (very thin glass or plastic) is placed over the tissue and the edges are bonded. The coverslip allows for easier viewing under the microscope.

Some diagnoses require the use of other types of staining. For example, special stains are used to diagnose microbial infections. As another example, IHC is a method of using antibodies to test for the presence of specific proteins. It is used to primarily to characterize cancers more specifically. The staining process is similar to H&E, in that the paraffin needs to be removed and the tissue rehydrated. However, there is an extra step in which the protein antigen in the tissue is "retrieved" by heating the tissue to perhaps 90° C. in various buffers. Once the antigen is retrieved, the antibody is applied. The slide is then washed, and a labeling step is performed to apply color to the slide where the antibody has stuck to the tissue.

From the foregoing, it is evident that the processing of collected tissue for subsequent study involves many steps and a considerable amount of time. Thus, any improvements in such processing that eliminate one or more of these steps and/or reduce the amount of time required would be desirable. It would also be desirable to avoid the need for using highly toxic reagents such as xylene when processing tissue.

In the case of studying nucleic acids (DNA and RNA), the exposure of tissue to aromatic hydrocarbons in laboratory-grade xylene or xylene substitutes is known to cause oxidation of guanosine nucleotides in DNA and RNA. Xylene causes oxidation of guanosine nucleotides in DNA to 8-hydroxydeoxyguanosine and in RNA to 8-hydroxyguanosine. Oxidized guanosine nucleotides may introduce sequencing artifacts or mutations into the DNA or RNA that are amplified by the polymerase chain reaction (PCR) typically performed for subsequent genomic analysis. Thus, it would be desirable to provide a way to remove paraffin from tissue samples that avoids the use of xylene or xylene substitutes and consequently avoids oxidative damage to guanosine nucleotides, thereby enabling the extraction from tissues of DNA and RNA of superior quality. Technologies that may benefit from superior nucleic acid quality include, for example, DNA microarrays, NANOSTRING™ assaying techniques, quantitative PCR (qPCR), and next generation sequencing technologies. Another technology that may benefit from better-quality nucleic acid is hybridization of DNA or RNA probes to nucleic acids in the tissue for detection of mutations by, for example, in situ hybridization (ISH) such as fluorescence in situ hybridization (FISH) and chromogenic in situ hybridization (CISH).

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for preparing a tissue includes: providing a tissue embedded with paraffin; generating an electric field effective to produce plasma and direct charged species of the plasma to the paraffin; and applying the electric field to the tissue, wherein the electric field removes at least some of the paraffin from the tissue by moving the paraffin away from the tissue by electrostatic force.

According to another embodiment, a tissue preparation apparatus includes: a support structure configured to support a tissue embedded with paraffin; and an electric field-generating device comprising a voltage source, a first electrode configured to be coupled to the voltage source, and a second electrode, wherein: the electric field-generating device is configured to generate an electric field between the first electrode and the second electrode; and the electric field is effective to produce plasma, direct charged species of the plasma to the paraffin, and move the paraffin away from the tissue by electrostatic force.

Other devices, apparatuses, systems, methods, features and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 2A is a schematic elevation view of the tissue preparation apparatus (or a portion thereof) illustrated in FIG. 1, illustrating an example of its operation according to an embodiment of the present disclosure.

FIG. 2B is a schematic elevation view of the tissue preparation apparatus similar to FIG. 2A, but at a later point in time.

FIG. 2C is a schematic elevation view of the tissue preparation apparatus similar to FIG. 2B, but at a later point in time.

FIG. 3A is a photograph showing a top view of an electrode positioned above a mass of paraffin, illustrating an example of the use of an electric field to move paraffin across a surface according to an embodiment of the present disclosure.

FIG. 3B is a photograph similar to FIG. 3A, but at a later point in time.

FIG. 3C is a photograph similar to FIG. 3B, but at a later point in time.

FIG. 5A is a photograph showing a side perspective view of tissue preparation apparatus according to an embodiment of the present disclosure, illustrating an example of utilizing an electric field to remove paraffin from a vertically oriented paraffin-embedded tissue sample.

FIG. 5B is a photograph of the tissue preparation apparatus similar to FIG. 5A, but at a later point in time.

FIG. 5C is a photograph of the tissue preparation apparatus similar to FIG. 5B, but at a later point in time.

FIG. 5D is a photograph of the tissue preparation apparatus similar to FIG. 5C, but at a later point in time.

DETAILED DESCRIPTION

Figure 1:
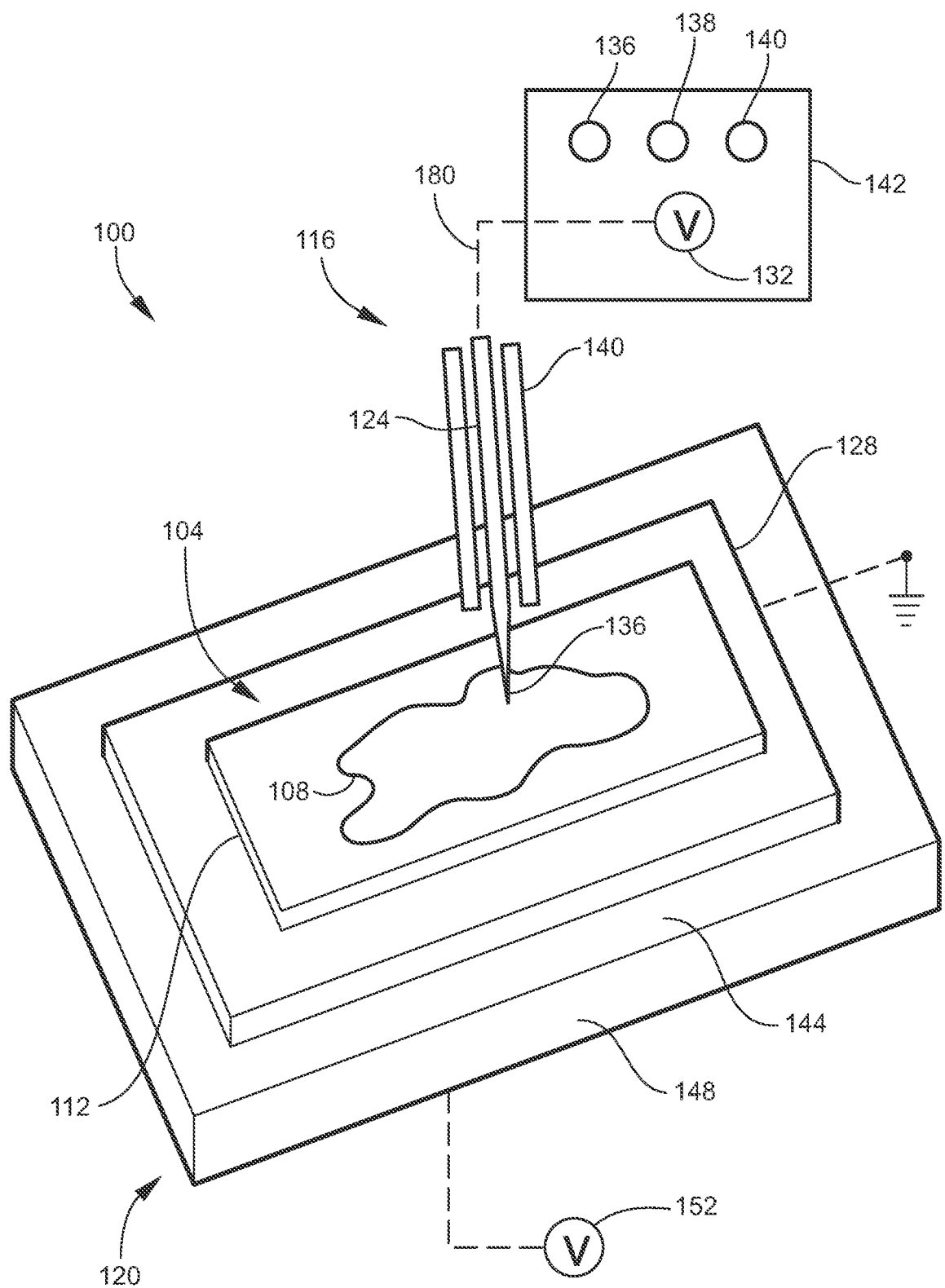
FIG. 1 is a schematic perspective view of an example of a tissue preparation apparatus according to an embodiment of the present disclosure.

The present disclosure provides methods and apparatuses (or systems) for removing paraffin from paraffin-embedded tissue (e.g., an organized ensemble of biological cells). In an embodiment, an electric field is generated. The electric field is applied in a manner effective to move the paraffin away from the tissue, thereby removing the paraffin from the tissue.

Without wishing to be bound by any specific theory at the present time, it is believed that the electric field produces plasma in a region (i.e., gaseous environment) proximate to the paraffin-embedded tissue. The plasma includes electrically charged species, namely electrons and gas-phase ions formed by ionizing neutral gas molecules in the region. The electric field directs at least some of these charged species toward the paraffin-embedded tissue. Some of these charged species are able to reach the paraffin and accumulate on the paraffin, thereby electrically charging (e.g., imparting electrical surface charge to) the paraffin. The accumulated charge renders the paraffin responsive to the electric field. Hence, due to the position of the electric field and/or the spatial orientation of the potential gradient of the electric field relative to the charged paraffin, the charged paraffin moves in response due to electrostatic force.

In an embodiment, the electric field is moved relative to the tissue, such as by moving an electrode utilized to generate the electric field and/or moving a substrate supporting the tissue relative to such electrode. The electric field may be moved in a direction that promotes movement of the paraffin away from the tissue, thereby assisting in removing the paraffin from the tissue.

In a typical embodiment, the electrostatic force is electrostatic charge repulsion occurring between the accumulated charges on the paraffin and the charged species of the plasma having the same polarity as the polarity of the accumulated charges, and/or between the accumulated charges and an electrode having the same polarity that is utilized to generate the electric field. That is, the charged paraffin is pushed away from the electric field and/or electrode. In an alternative embodiment, the electrostatic force is electrostatic charge attraction occurring between the accumulated charges on the paraffin and the charged species of the plasma (and/or electrode) having a polarity opposite to the polarity of the accumulated charges. In the latter case, the charged paraffin is pulled toward the electric field or electrode.

In an embodiment, a small amount of solvent is applied to the tissue to assist in removing the paraffin from the tissue. The solvent may be added before or after activation of the electric field. The solvent may be responsive to the electric field in a manner similar to the paraffin, such that the applied electric field moves the solvent along with the paraffin out from the tissue.

In an embodiment, heat energy is applied to the paraffin-laden tissue to assist in removing the paraffin from the tissue, and/or to assist in removing paraffin from a tissue-supporting substrate (e.g., microscope slide) after the paraffin has been separated from the tissue by the applied electrostatic force. The heat energy may be applied to render the paraffin flowable, i.e., to melt the paraffin. The heat energy may be applied before, during, or after applying the electric field, as needed. That is, the application of the heat energy may be initiated before, during, or after applying the electric field, and the application of the heat energy may be terminated before, during, or after applying the electric field, as needed. Heating may or may not be utilized in conjunction with solvent treatment.

The electric field may be applied (generated and maintained), or both the electric field and heat energy may be applied, until most or all of the paraffin has been removed from the tissue.

In some embodiments, for removing paraffin from paraffin-laden tissue as disclosed herein renders the tissue substantially free of paraffin. As used herein, the phrase "substantially free of paraffin" may mean that a tissue subjected to a paraffin-removing method as disclosed herein thereafter can be successfully stained by routine techniques (e.g. hematoxylin and eosin or H&E, in situ hybridization or ISH, etc.), because any residual paraffin (the paraffin still remaining in/on the tissue after being subjected to the method) is too low to interfere with the process of staining. As another example, in a tissue substantially free of paraffin, the residual paraffin may not be visible to the naked (unaided) eye, but may be observed (such as a thin film) with the use of a microscope, such as for example a microscope equipped with polarized lenses. As another example, a tissue substantially free of paraffin may be stable at room temperature for an extended period of time (e.g., overnight) due to the absence of liquid, and can be readily stained after the extended period of time.

As another example, a tissue "substantially free of paraffin" may refer to a tissue that, after being subjected to a paraffin-removing method as disclosed herein, is greater than 98% free of paraffin, i.e., contains less than 2% residual paraffin, or less than 1% residual paraffin, or less than 0.5% residual paraffin, or less than 0.4% residual paraffin, or less than 0.3% residual paraffin, or less than 0.2% residual paraffin, or less than 0.1% residual paraffin, or less than 0.05% residual paraffin, or less than 0.01% residual paraffin, etc.

As used herein, the phrase "removing substantially all of the paraffin" may mean removing greater than 98% of the original paraffin in a tissue. As examples, the amount of residual paraffin remaining in the tissue (after subjecting the tissue to a paraffin-removing method as disclosed herein) may be less than 2%, or less than 1%, or less than 0.5%, or less than 0.4%, or less than 0.3%, or less than 0.2%, or less than 0.1%, or less than 0.05%, or less than 0.01%, etc., of the amount of the original paraffin in the tissue.

Accordingly, methods disclosed herein include "dry" techniques that remove paraffin from paraffin-embedded tissue by applying an electric field, or both an electric field and heat energy, without adding any liquid to the tissue. In addition, methods disclosed herein include "wet" techniques that additionally apply a solvent to assist in removing paraffin from paraffin-embedded tissue. In the latter case, however, a much smaller amount of solvent is utilized, and a much less toxic solvent is utilized, in comparison to conventional techniques.

In an embodiment, residual paraffin and/or solvent remains with the tissue after the electric field is utilized in the deparaffinization process. The residual paraffin and/or solvent may be desirable for preventing the tissue from drying out excessively as a result of the deparaffinization process. Additionally or alternatively, a wetting agent may be applied to the tissue to assist in preventing the tissue from drying out excessively. For example, the wetting agent may be applied after applying the electric field.

Non-limiting examples of embodiments of tissue preparation apparatuses useful for removing paraffin from tissue, utilizing an electric field modality optionally assisted by solvent and/or heat treatment, will now be described.

FIG. 1 is a schematic perspective view of a tissue preparation apparatus (or device, or system) 100 according to an embodiment. The apparatus 100 may also be referred to as a paraffin removal apparatus or a tissue deparaffinization apparatus. FIG. 1 also illustrates a supported tissue arrangement (or tissue sample) 104 that includes a tissue 108 disposed on an upper surface of a solid substrate 112 (e.g., a microscope slide). The tissue 108 may be adhered to the solid substrate 112, or alternatively may freely rest on the solid substrate 112 in an unbound manner. For example, the tissue sample 104 may have been collected and processed as described above in the background section of the present disclosure. Thus, when initially provided for processing by the apparatus 100, the tissue 108 is impregnated with paraffin. In addition to a slide, other examples of solid substrates 112 include, but are not limited to, a plate, one or more beads, a porous medium, a frit or filter, and a liquid container. The apparatus 100 is configured for removing paraffin from a tissue 108, which may be done in preparation for staining as described above, or for other desired processing or analysis. The substrate 112 may have a higher surface energy than the paraffin and/or the tissue 108, so that after the paraffin is removed the tissue 108 adheres to the substrate 112.

Generally, the apparatus 100 includes an electric field-generating device 116. The apparatus 100 may further include a support structure 120. In some embodiments, the support structure 120 may be or include a heating device.

The electric field-generating device 116 includes an electrode arrangement, such as one or more first electrodes (or discharge electrodes) 124 and one or more second electrodes (or counter-electrodes) 128, and an appropriate voltage source (or electrical power supply) 132. The voltage source 132 may be a direct current (DC) voltage source or an alternating current (AC) voltage source. As an AC voltage source, the voltage source 132 in some embodiments may be a high-frequency voltage source such as a radio-frequency (RF) voltage source or a microwave-frequency voltage source. At least the first electrode 124 is in electrical communication with the voltage source 132 via an appropriate electrical (current-carrying) line 180 such as an insulated wire, cable, etc. Depending on the embodiment, the second electrode 128 may be in electrical communication with the voltage source 132 or associated electronics (electrical circuitry). The second electrode 128 may be coupled to electrical ground, or held at some other voltage potential different from the voltage potential applied to the first electrode 124, to generate a potential difference (voltage) between the first electrode 124 and the second electrode 128. In one non-exclusive example, the voltage source 132 is a high-voltage source capable of applying a voltage potential (DC magnitude or peak AC amplitude) to the first electrode 124 on the order of kilovolts (kV). For example, the voltage potential (relative to ground) may be in a range (in absolute value) from about 1000 V (1 kV) to about 30,000 V (30 kV). The voltage potential applied may be positive or negative, i.e., the range may be from about +1000 V to about +30,000 V or from about −1000 V to about −30,000 V. The foregoing range is merely one example. Depending on the embodiment, the voltage potential may be less than 1000 V (absolute value) or greater than 30,000 V (absolute value). More generally, the voltage source 132 is capable of applying a DC or AC voltage to the first electrode 124 at a magnitude (or in the case of AC power, a peak-to-peak amplitude and frequency) that is sufficient or effective to strike and maintain a plasma (e.g., corona discharge) in the environment (e.g., air or other gas(es)) in which the first electrode 124 and the tissue 108 are located.

In some embodiments, the first electrode 124 may include a feature (such as an end feature or tip feature) that is a (highly) curved feature configured to generate a region of elevated electric field strength surrounding the first electrode 124 (particularly at the curved feature). For example, the curved feature may be a sharp or geometrically abrupt feature, such as an edge or a pointed tip, or a small-diameter wire. In the illustrated embodiment, the first electrode 124 is configured as an elongated rod that terminates at a distal electrode tip 136. The first electrode 124, or at least a tip section thereof that terminates at the distal electrode tip 136, may be tapered such that the distal electrode tip 136 is sharp or pointed. Generally, a sharper distal electrode tip 136 generates a stronger electric field at the distal electrode tip 136, as compared to a more blunt geometry. Thus, the first electrode 124 may be configured as a needle or pin (e.g., a corona discharge needle).

In some embodiments, the first electrode 124 may be coaxially surrounded by a body or housing 140 (shown in cross-section in FIG. 1) composed of an electrically insulating material. The electrically insulating material may also be a sufficiently thermally insulating material, or the body 140 may further include a thermally insulating material coaxially surrounding the electrically insulating material. In some embodiments, the first electrode 124 is movable relative to the tissue 108, as described further herein. The insulating body 140 may be configured to be hand-held by a user. That is, the first electrode 124 may be configured as a hand-piece that is held by a user like a pen. Alternatively, the insulating body 140 may be configured to be mounted to an automated device (e.g., a motorized stage or robot) as appreciated by persons skilled in the art. Thus, depending on the embodiment, the first electrode 124 may be movable relative to the tissue 108 in a manual or automated manner.

The second electrode 128 is typically configured to serve as a counter-electrode or ground plane. The second electrode 128 may be positioned to cooperate with the first electrode 124 in defining the location and spatial orientation of the electric field and plasma generated by the applied voltage. In some embodiments and as illustrated, the second electrode 128 is positioned on a side of the tissue 108 opposite to the first electrode 124. In other words, the tissue 108 is positioned between the first electrode 124 and the second electrode 128. In other embodiments, the second electrode 128 may be positioned above the tissue 108, or juxtaposed at roughly the same elevation as the tissue 108 relative to some reference plane. In the illustrated embodiment, the second electrode 128 has a thin planar (plate-shaped) geometry of greater planar area than that of the tissue sample 104, and the tissue sample 104 is placed onto the second electrode 128. As one non-limiting example, the second electrode 128 may be a metallic (e.g., aluminum) foil. In other embodiments, the second electrode 128 may have an elongated rod-type geometry similar to the illustrated example of the first electrode 124. In various embodiments, more than one first electrode 124 and/or more than one second electrode 128 may be provided.

In further embodiments, particularly when AC power is utilized, the second electrode 128 may coaxially surround the first electrode 124 such that an electrically insulating portion of the body 140 is interposed between the first electrode 124 and the second electrode 128. In this case, the second electrode 128 may in turn be coaxially surrounded by electrically insulating and/or thermally insulating material, which may be considered as being part of the schematically illustrated body 140.

The apparatus 100 may include electronics that include the voltage source 132 and other appropriate components. The electronics may further include, for example, an ON/OFF switch 136 for controlling the ON/OFF state of the voltage source 132, a voltage adjustment component 138 (e.g., a control knob) configured for adjusting the level or magnitude (and possibly also the polarity) of the voltage potential applied to the first electrode 124, one or more indicators 140 (e.g., gauges, light-emitting diodes (LEDs) or other visual output components, speakers or other auditory output components) to provide indications of the voltage level being applied, the status of one or more operations of the electric field-generating device 116, etc., as appreciated by persons skilled in the art. Some or all of the electronics may be arranged in a control console 142 of the apparatus 100. In hand-held embodiments, one or more components of the electronics (e.g., the ON/OFF switch 136, voltage adjustment component 138, etc.) may be located at the insulating body 140 so as to be easily accessible by the user. Alternatively, such components or controls may be located at the control console 142 as illustrated, or at a user foot-operated module. The control console 142, or one or more components of the electronics, may be part of or communicate with (by wired or wireless means) a computing device. The computing device may be, for example, a desktop computer, laptop computer, portable computer, tablet computer, handheld computer, mobile computing device, personal digital assistant (PDA), smartphone, etc., and may include one or more types of hardware (e.g., electronic-based processors, memories, user input peripherals, user output peripherals, etc.), firmware, and/or software, as appreciated by persons skilled in the art.

The support structure 120 generally may be any structure suitable for providing a support or mounting surface for the tissue arrangement 104. For this purpose, the support structure 120 may include mounting features (not shown) configured to engage the tissue arrangement 104 (particularly the solid substrate 112) to fix the position of the tissue arrangement 104 in/on the apparatus 100. The support structure 120 generally may include an upper (or outer) surface 144 on which the tissue arrangement 104 is disposed, and a body or block 148 that includes the upper surface 144.

As noted above, the support structure 120 may be or include a heating device, in which case the upper surface 144 of the body 148 may serve as a heating surface. The heating device generally may have any configuration effective for generating and transferring heat energy to the upper surface 144. Thus, for example, the support structure 120 as a heating device may include one or more resistive heating elements (not specifically shown) disposed in or on the body 148 in thermal contact with the upper surface 144, or disposed directly on upper surface 144 or integral with the upper surface 144. In an embodiment, the upper surface 144 itself may serve as the heating element. The support structure 120 may also include a heater voltage source (power supply) 152 providing electrical current to the heating element(s).

The support structure 120 or heating device may also include electronics (not shown) configured for controlling the heating device similar to the electronics of the electric field-generating device 116 described above. Thus, for example, the heating device may include an ON/OFF switch configured for controlling the ON/OFF state of the heater voltage source 152, a voltage adjustment component (e.g., a control knob) configured for adjusting the heater voltage source 152 and thus the level of the heat energy applied by the heating element(s), one or more visual and/or auditory indicators to provide information regarding the operation of the heating device, etc., as appreciated by persons skilled in the art. The electronics of the heating device may be arranged in the control console 142 described above or in a separate control console, or at a user foot-operated module.

In the illustrated embodiment, with the support structure 120 configured as a heating device, the second electrode 128 is thermally conductive and is placed or mounted on the upper surface 144 of the support structure 120. The tissue arrangement 104 (tissue 108 and supporting substrate 112) are in turn placed or mounted on the second electrode 128. In some embodiments, the second electrode 128 may be integral with the support structure 120 and may serve as the upper surface 144 of the support structure 120 and thus as the heating surface of the heating device. In other embodiments, the second electrode 128 may be a separate, replaceable component such as a metal plate, foil, or the like. In all such embodiments, heat energy may be applied to the tissue 108 by heating the second electrode 128.

As an alternative (or in addition) to resistive heating elements, the heating device may provide one or more radiant heating sources such as, for example, infrared (IR) lamps. Additionally or alternatively, the tissue arrangement 104 may be placed in a chamber and the heating device may be configured to heat the chamber (i.e., the gas(es) inside the chamber), whereby the tissue 108 is heated by convection.

In an embodiment, in operation, the first electrode 124 is movable relative to the support structure 120 (and thus relative to the tissue arrangement 104) and the support structure 120 is stationary. In another embodiment, the support structure 120 (and thus the tissue arrangement 104) is movable relative to the first electrode 124 and the first electrode 124 is stationary. In another embodiment, the first electrode 124 and the support structure 120 are movable relative to each other. The second electrode 128 may or may not be movable, depending on how it is positioned relative to the support structure 120. In all such cases, the movement of first electrode 124 and/or the support structure 120 relative to the other moves the electrical field (in terms of its position and spatial orientation) applied by the electric field-generating device 116 relative to the tissue arrangement 104, as described further below.

In the present embodiment, the apparatus 100, including the support structure 120, has an open architecture, in that the apparatus 100 may be positioned and operated in an ambient environment, for example on a bench top, table top, or the like. Alternatively, the apparatus 100 may include an enclosure or chamber (not shown) in which the first electrode 124, the second electrode 128 and the support structure 120 (or at least the upper surface 144 thereof) are positioned, and into which the tissue arrangement 104 is loaded. Such a chamber may be provided if it is desired to control one or more parameters of the operating environment of the tissue 108, such as gas composition, pressure, temperature, light intensity, etc.

FIGS. 2A-2C are time-sequential schematic elevation views of the tissue preparation apparatus 100 (or a portion thereof), illustrating an example of its operation according to an embodiment. FIGS. 2A-2C illustrate a mass of paraffin 268 disposed on the solid substrate 112 between the first electrode 124 and the second electrode 128 of the electric field-generating device 116 (FIG. 1). In this example, the tissue preparation apparatus 100 is assumed to operate in an open-air environment.

Referring to FIG. 2A, the electric field-generating device 116 (FIG. 1) is activated to generate an electric field. In the present example, the first electrode 124 is negatively charged (energized to a negative polarity) and the second electrode 128 is grounded. For example, a voltage potential of −10 kV may be applied to the first electrode 124, thereby generating an electric field between the first electrode 124 and the second electrode 128 having a potential difference of −10 kV. More generally, the strength (potential gradient) of the electric field may be selected to be great enough to generate and sustain plasma 260 (a corona discharge in the present example) in a region of air around the distal tip 136 of the first electrode 124, but not so great as to cause electrical arcing (due to electrical breakdown in the air) between the first electrode 124 and another object such as the second electrode 128.

The electric field accelerates free electrons in the air into collisions with neutrals (neutral atoms and molecules) in the air. Some of the collisions occur at an energy high enough to ionize the impacted neutrals, thereby liberating more electrons and leading to more collisions between free electrons and neutrals. As long as the electric field is present and of sufficient strength, the ionization events continue in a chain-reaction effect termed an electron avalanche. Photons are also generated in the plasma 260 due to recombination events occurring between electrons and positive ions. The photons may also contribute to ionization of neutrals via impact. Negative ions (molecules that have gained an electron, as opposed to have lost an electron) may be produced as well as positive ions. Thus, the plasma 260 generated by the electric field-generating device 116 generally may be a mixture of charged species or particles (positive ions, negative ions, and electrons) and neutrals, as well as other energetic species such as metastables and photons. For simplicity, FIG. 2A illustrates only negative ions 262 produced in the plasma 260.

Referring to FIG. 2B, due to the orientation of the potential gradient of the electric field and electrostatic repulsion from the negatively charged first electrode 124 and negative charge in the plasma 260, negatively charged species of the plasma 260 (negative ions 262 and electrons) are directed by the electric field in a direction generally from the first electrode 124 toward the second electrode 128 and hence toward to the paraffin 268. At least some of these negatively charged species migrate to the paraffin 268 and accumulate on the paraffin 268 (for example, on exposed surfaces of the paraffin 268), as depicted by accumulated negatively charged species 266 in FIG. 2B. In this manner, the paraffin 268 (or at least the surface(s) thereof) becomes electrically charged and therefore responsive to the electric field.

Referring to FIG. 2C, due to the electrostatic repulsion, the charged paraffin 266 moves away from the electric field in one or more directions. For example, as illustrated, the paraffin 266 may move radially outward relative to the position of the distal tip 136 of the first electrode 124, or relative to a line defining the distance between the distal tip 136 and the tissue 108. This mechanism may be utilized to separate and remove the paraffin 268 from tissue in which the paraffin 268 is incorporated. The removal mechanism may be enhanced or facilitated by moving the electric field relative to the tissue, as described herein. For example, before or after initiating the electric field, the first electrode 124 may be moved downward toward the tissue 108, thereby decreasing the distance between the distal tip 136 (and thus the strongest region of the electric field) and the tissue 108. Alternatively or additionally, the (distal tip 136 of) the first electrode 124 may be moved in a direction generally parallel to the tissue 108, i.e. in a direction generally transverse or perpendicular to a line (e.g., vertical line, from the perspective of FIG. 2C) between the distal tip 136 and the tissue 108 and underlying substrate 112.

In the example just described, the plasma 260 is a negative corona discharge. In an alternative embodiment, the first electrode 124 may have a positive polarity relative to the second electrode 128. In this case, the plasma 260 may be a positive corona discharge. In this case, positive ions are repelled from the first electrode 124 and directed toward the second electrode 128. Accordingly, positive ions instead of negatively charged species may accumulate on the paraffin 268. The differences in the mechanisms involved in forming and sustaining negative corona discharges and positive corona discharges, and the differences in the properties of negative corona discharges and positive corona discharges, are understood by persons skilled in the art and thus need not be described herein. In the implementation of the subject matter disclosed herein, the general or overall effect of the plasma 260 may be similar regardless of the polarity of the electrode(s) utilized and resulting electric field. Namely, the plasma 260 provides a source of charged species utilized to impart charge to the paraffin 260, whereby the paraffin 260 becomes responsive to the electric field such that the electric field may be utilized to manipulate the paraffin 260.

FIGS. 3A-3C illustrate an example of utilizing an electric field to move paraffin across a surface. FIGS. 3A-3C are sequentially taken photographs showing a top view of an example of a first electrode 324 positioned above a mass of paraffin 368 disposed on a 2×3 inch glass slide, which is disposed on a solid surface 312 serving as a grounded counter-electrode. The solid surface 312 is marked with concentric circles indicating radial distance (in millimeters, mm) from a center point at which the paraffin 368 is initially positioned. FIGS. 3A-3C show a time sequence of operation after a voltage potential of −10 kV is applied to the first electrode 324. Specifically, the photograph of FIG. 3A was taken at time T=0 seconds (s), the point at which application of the voltage potential was initiated, the photograph of FIG. 3B was taken at time T=5 s, and the photograph of FIG. 3C was taken at time T=10 s. It is observed that as the electric field is applied over time, the paraffin 368 moves radially outward along the glass slide, away from its original central position and away from the electric field due to electrostatic repulsion.

Figure 4:
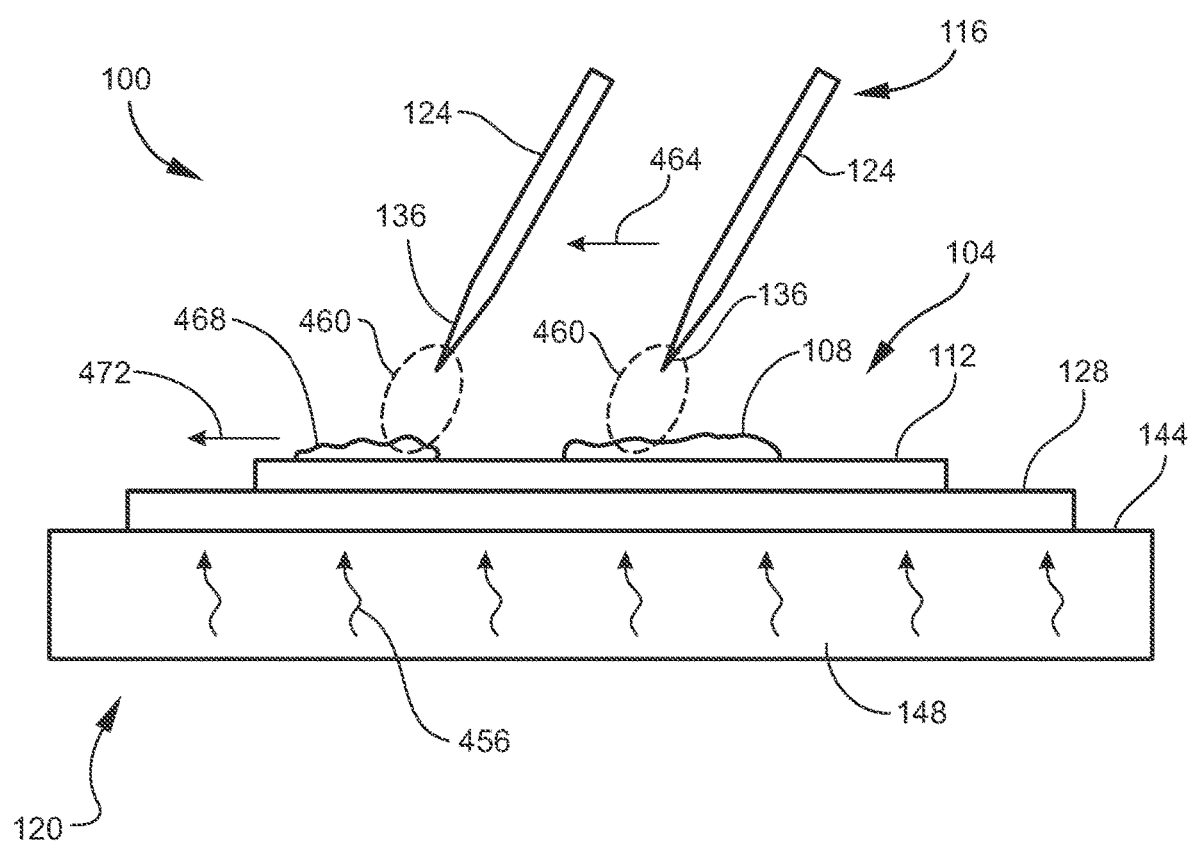
FIG. 4 is a schematic elevation view of the tissue preparation apparatus illustrated in FIG. 1, further illustrating its operation.

FIG. 4 is a schematic elevation view of the tissue preparation apparatus 100 illustrated in FIG. 1, further illustrating its operation. The tissue arrangement 104 is positioned (and securely mounted, if needed) on the support structure 120. In embodiments that include a heating device (such as part of the support structure 120), the tissue arrangement 104 is positioned such that the tissue 108 and supporting substrate 112 are in thermal contact with the heating device. In the illustrated embodiment, thermal contact is made via the second electrode 128 and the upper surface 144 of the body 148. The support structure 120, if operated as a heating device, may then be activated (at a desired point in time, and for a desired period of time) to generate and transfer heat energy 456 to the upper surface 144 and the second electrode 128, and consequently to the tissue 108 via heat conduction. A sufficient amount of heat energy 456 may be deposited in the tissue 108 to melt the paraffin embedded therein, thereby rendering the paraffin readily flowable. The tissue 108 may be heated to, for example, a temperature in a range of about 35° C. to about 70° C. More generally, the tissue 108 may be heated to the melting point of the paraffin, which falls within the foregoing range.

Before, during, or after activating the heating device, the electric field-generating device 116 is activated to generate an electric field and consequently plasma 460 in the manner described above. In FIG. 4, the closed dashed line referred to herein as the plasma 460 schematically depicts the outer spatial extent of the plasma 460 (or at least the active plasma), which may also be referred to as the ionization or plasma-forming region. This region (or plasma 460) may or may not actually extend to the tissue 108. Outside this region, the electric field is not strong enough to sustain plasma 460 in the air (or other gaseous medium). In other words, plasma 460 is extinguished outside of this region, although charged species produced in the plasma 460 may be transported to the tissue 108 under the influence of the electric field as described herein. It will be understood that the plasma 460 is depicted schematically for illustrative purposes. In practice, the actual size and shape of the plasma 460 (e.g., cloud, plume, etc.) may differ appreciably from the schematic depiction shown in FIG. 4.

As depicted in FIG. 4, the energized first electrode 124 is positioned above the tissue 108, and close enough to the tissue 108 that the electric field surrounding the electrode tip 136 is strong enough to have a repelling effect on the paraffin in/on the tissue 108 sufficient to induce motion of the paraffin. For this purpose, the first electrode 124 may be positioned (and moved, if needed) such that the distal tip 136 is at a suitable distance from the tissue 108 suitable for inducing motion of the paraffin. Consequently, the paraffin in/on the tissue 108 is repelled by charged species of the plasma 460 and the charged first electrode 124 having the same polarity as the surface charge accumulated on the paraffin, such that the paraffin moves by electrostatic force out from the tissue 108.

In an embodiment, the first electrode 124 may be moved in any desired direction across (over) the tissue 108 and the underlying substrate 112 to further promote movement of the paraffin by electrostatic force out from the tissue 108. Thus, movement of the first electrode 124 in a given direction will push or pull (depending on polarity) the paraffin in the same general direction. As one non-limiting example, FIG. 4 depicts the first electrode 124 being moved over (without contacting) the tissue 108 in the leftward direction (from the perspective of FIG. 4), as indicated by a horizontal arrow 464. In this example, the first electrode 124 and the paraffin have the same polarity. Consequently, the movement of the first electrode 124 causes the paraffin to be pushed in the same leftward direction, whereby the paraffin leaves the confines of the tissue 108. For example, FIG. 4 depicts a mass of paraffin 468, having been separated from the tissue 108, being moved away from the tissue 108 along the surface of the substrate 112 in response to the movement of the first electrode 124 and the tip-localized electric field and energetic plasma 260 generated thereby. In this example, the paraffin 468 flows in the leftward direction as indicated by a horizontal arrow 472. The movement of the paraffin 468 optionally may be enhanced or facilitated by treating the paraffin 468 with a solvent, and/or heating the paraffin 468 to ensure it is in a flowable (melted) state, as described herein.

Non-limiting embodiments of a method for preparing a tissue will now be described, using as an example the apparatus 100 described above and illustrated in FIGS. 1-4.

According to the method, a paraffin-embedded tissue 108 is provided. Providing the tissue 108 may include various processing steps after initially acquiring the tissue 108 from the tissue source, such as fixing, dehydration, alcohol removal, paraffin infiltration/embedding, sectioning, etc. as described herein. In this example, providing the tissue 108 includes positioning (placing or mounting) the tissue 108 on a solid substrate 112, thereby providing a tissue arrangement (or tissue sample) 104, and positioning (placing or mounting) the tissue arrangement 104 on or near a (second) electrode 128.

An electric field is then generated that is effective to produce plasma 460 and direct charged species of the plasma 460 to the paraffin in the tissue 108. At least some of the charged species may reach the tissue 108 and accumulate on the paraffin, thereby imparting charge (e.g., surface charge) to the paraffin.

The electric field is applied to the tissue 108 such that the electric field is effective to remove at least some of the paraffin from the tissue 108 by moving the paraffin outward and away from the tissue 108 by electrostatic force. In an embodiment, applying the electric field entails positioning the electric field close enough to the tissue 108 that the electric field is strong enough near the paraffin to effect movement of the paraffin by electrostatic force.

In the illustrated embodiments, the tissue 108 is positioned between a first electrode 124 and a second electrode 128, and the electric field is generated between the first electrode 124 and the second electrode 128 by applying a voltage potential at least to the first electrode 124 to generate a voltage difference between the first electrode 124 and the second electrode 128. In such embodiments, the electric field is positioned by positioning the first electrode 124 relative to the tissue 108. In an embodiment, at the time the electric field is initiated, the first electrode 124 may already be positioned at a sufficient distance from the tissue 108 for the electric field to be effective in influencing movement of the paraffin by electrostatic force. Thus, in some embodiments, the steps of generating the electric field and applying the electric field may be the same (or substantially the same) step, or occur or be performed at the same (or substantially the same) time.

In other embodiments, after generating the electric field, the electric field may be moved relative to the tissue 108, such as by moving the first electrode 124 relative to the tissue 108. In such embodiments, applying the electric field entails moving the electric field.

The electric field may be moved in a direction that moves the paraffin away from the tissue 108 by electrostatic force. For example, the first electrode 124 may be moved toward to tissue 108, as described above in conjunction with FIG. 2C. Additionally or alternatively, the first electrode 124 may be moved across (over) the tissue 108 (without contacting the tissue 108) in a direction generally parallel to tissue 108, as described above and illustrated in FIG. 4.

The first electrode 124 may be moved in one or more directions relative to the tissue 108, and may be moved across (over) the tissue 108 one or more times, as needed to remove all or a substantial portion of the paraffin from the tissue 108. For example, the first electrode 124 may be moved in one or more "passes" (or iterations of movement) across (over) the tissue 108. A single pass may entail or be defined by moving the first electrode 124 from a starting position (such as at or near an edge of the tissue 108 or solid substrate 112) to an ending position (such as at or near an opposite edge of the tissue 108 or solid substrate 112). This pass may be repeated one or more times as needed. While repositioning the first electrode 124 for another pass, the voltage applied to the first electrode 124 may be turned OFF, and/or the first electrode 124 may be moved farther away from the tissue 108 and paraffin 468, as needed to properly control the deparaffinization process. Typically, the first electrode 124 is moved while the tissue 108 remains stationary. Alternatively or additionally, the tissue 108 may be moved relative to the first electrode 124.

For a given electric field strength, the first electrode 124 (or the distal tip 136 thereof, e.g., as illustrated in FIG. 4) should be positioned at some minimum distance from the tissue 108 that ensures the paraffin will move in response to movement of the first electrode 124 and the region of highest strength of the electric field. In one embodiment, while the electric field is active, the position of the first electrode 124 (or the distal tip 136 thereof) is maintained at a distance (or gap) from the tissue 108 in a range from about 1 mm to about 50 mm, or from 1 mm to 50 mm. As used herein, the term "about" may encompass a range of +/−10% of the stated value. For example, "about 1 mm" may mean a range from 0.9 mm to 1.1 mm. This distance may be maintained while moving the first electrode 124 relative to the tissue 108 and/or the tissue relative 108 to the first electrode 124.

In an embodiment, the method as just described is effective to remove a majority of the paraffin from the tissue 108, while leaving a residual amount of paraffin incorporated in/or the tissue 108. Leaving a residual amount of paraffin with the tissue 108 may be desirable, because the residual paraffin may act as a stabilizer for the tissue 108. That is, the residual paraffin may be useful for protecting the tissue 108 from drying out and possibly becoming damaged (e.g., due to exposure to air) and/or failing to remain adhered to the underlying solid substrate 112.

In a further embodiment, to further ensure that the tissue 108 will not dry out after removing paraffin according to the method just described, a wetting agent may be applied (added) to the tissue 108, such as by utilizing a suitable liquid dispensing device such as, for example, a pipette (e.g., a manual pipette tip or an automated pipettor), a nozzle, a sprayer or mister, etc. Any suitable wetting agent may be utilized for this purpose, a few non-exclusive examples being water, an alcohol such as ethanol, and any common aqueous buffer routinely used in histochemistry. For example, the wetting agent may be applied after applying the electric field.

In another embodiment, the method may entail applying (adding) a solvent to the tissue 108 before, during, or after the initiation of the electric field and associated deparaffinization process. The solvent may be any solvent effective for enhancing the electric field-based process of removing paraffin described herein. The solvent may be applied by any suitable liquid dispensing technique such as pipetting. As the solvent treatment is merely enhancing the electric field-based process, only a small aliquot of solvent may be utilized, for example, on the order of tens of microliters (µL), e.g., 20-50 µL. The paraffin may be at least partially soluble in and/or diluted by the solvent, depending on the composition of the solvent. In an embodiment, the solvent applied in this case is one that is affected by the electric field in a manner similar to the paraffin. For example, the solvent may accumulate charged species originating from the plasma 460 such that the solvent is moved along with the paraffin out from the tissue 108 due to electrostatic force. Non-limiting examples of solvents suitable for this purpose may include various nonpolar compounds such as naphtha or other hydrocarbon-based compounds. As used herein, "naphtha" may be composed primarily of a mixture of hydrocarbon compounds, although a small percentage (e.g., one or a few percent by weight) of the particular naphtha formulation employed may include other compounds, depending on the commercial source and as appreciated by persons skilled in the art. As one non-limiting example, a suitable naphtha formulation may include a mixture of hydrocarbon compounds in a range of C9-C40 hydrocarbon compounds (hydrocarbon compounds having 9-40 carbon atoms). One specific yet non-limiting example of a naphtha-based solvent is Clearify®™ clearing agent, which is commercially available from, for example, Agilent Technologies, Inc., Santa Clara, California, USA. Preferably, a highly toxic compound such as xylene is not utilized in the method.

In an embodiment, while or after applying the solvent, the tissue 108 may be agitated to enhance interaction of the paraffin with the solvent (e.g., mixing of the paraffin with the solvent, dilution of the paraffin by the solvent, or dissolution of the paraffin in the solvent). The tissue 108 may be agitated by agitating the solid substrate 112 on which the tissue 108 is supported, or the support structure 120 on which the tissue arrangement 104 is supported/mounted (FIG. 4). Agitation may be performed manually (e.g., by shaking the solid substrate 112 or the support structure 120), or by automated/motorized means such as by utilizing an orbital shaker, sonicator, or the like, as appreciated by persons skilled in the art.

The application of a solvent in conjunction with the electric field may be effective in removing all (or substantially all) of the paraffin from the tissue 108. In such a case, if solvent was applied, residual solvent may remain in the tissue 108 after removing the paraffin. The residual solvent may be effective to prevent the tissue 108 from drying out immediately after removing the paraffin. Alternatively or additionally, after removing the paraffin, an appropriate wetting agent may then be applied to the tissue 108 as described above to prevent the tissue 108 from drying out immediately after removing the paraffin.

In a further embodiment, the method may entail applying heat energy 456 (FIG. 4) to enhance separation and movement of the paraffin out from the tissue 108, for example to melt the paraffin and hence render the paraffin more flowable. The heat energy 456 may be applied for a period of time long enough to prevent the paraffin from re-solidifying during the removal process. Alternatively or additionally, the heat energy 456 may be applied to facilitate removing the paraffin from the solid substrate 112, and/or collecting the paraffin, after the paraffin has been removed from the tissue 108. Depending on the embodiment, the time period for heat energy application may or may not overlap with the time period for electric field application, as described further below.

The electric field, or optionally both the electric field and the heat energy, are applied, and the first electrode 124 is optionally moved (in one or more passes), for a duration sufficient to remove a desired amount the paraffin from the tissue 108. The desired amount may be all or substantially all of the paraffin from the tissue 108. The total duration required may be, for example, a about one minute or less as described above. In other words, the method may entail removing substantially all of the paraffin from the tissue 108. In one embodiment, the method is carried out until the tissue 108 is "substantially free of paraffin" as described herein.

In an embodiment, the method entails applying a solvent to the tissue 108 (as described above) before applying, or before initiating the application of, the electric field to the tissue 108. For example, the method may entail a first stage (or time period) during which the solvent is applied (without applying the electric field), followed by a second stage (or time period) during which the electric field is applied. The first stage may include a period of time after the solvent has been applied to allow the paraffin to interact with (e.g., mix with or diffuse into) the solvent.

In one embodiment, the solvent is applied to the tissue 108 at room temperature. As one example, applying the solvent at room temperature means that neither the solvent nor the tissue 108 is actively heated (such as by a heating device) during application of the solvent. As another example, applying the solvent at room temperature means that the solvent when applied to the tissue 108 is at a temperature in a range from about 15° C. to about 30° C., or from about 15° C. to about 25° C., or from about 18° C. to about 24° C., or from about 20° C. to about 22° C. Applying the solvent at room temperature may result in a residual amount of solvent remaining with the tissue 108 after the electric field has been utilized to remove most or all of the paraffin and most of the solvent. Leaving a residual amount of solvent with the tissue 108 may be desirable to prevent the tissue 108 from drying out, as described above.

In one embodiment, the solvent is applied to the tissue 108 at room temperature, and the electric field is then applied to the tissue 108. In an embodiment, after applying the solvent at room temperature and while applying the electric field, heat energy is applied to the tissue 108. The heating may reduce the amount of solvent needed in embodiments utilizing solvent.

In another embodiment, the method entails applying the electric field (or initiating the application of the electric field) to the tissue 108 before applying the solvent to the tissue 108. The electric field may continue to be applied while the solvent is applied and after the solvent is applied. Thus, the method may entail a "solvent-free" first stage (or time period) during which the electric field is applied without applying the solvent, followed by a second stage (or time period) during which the electric field is applied and paraffin removal is aided by the solvent that was previously added. In an embodiment, after the solvent-free first stage, the solvent is applied to the tissue 108 at room temperature.

In an embodiment, heat energy is applied to the tissue 108 while applying the electric field during the solvent-free first stage, the post-solvent addition second stage, or both stages.

In one particular embodiment, during the first stage both the electric field and heat energy are applied. After the first stage, application of the heat energy is ceased and the solvent is then applied. Then, during the second stage, the electric field is applied (or continues to be applied) without applying heat energy. The ceasing of application of the heat energy, and the application of the solvent, may be considered as occurring at the end of the first stage or the beginning of the second stage. This embodiment thus entails a heated, solvent-free first stage followed by a room-temperature, solvent-aided second stage. This embodiment may result in the majority of the paraffin being removed from the tissue 108 during the first stage (before application of the solvent), and the remaining paraffin being removed from the tissue 108 during the second stage (after application of the solvent).

As described above, the first electrode 124 may be moved in one or more passes across (over) the tissue 108, where a single pass may be considered as having a starting position, an ending position of the first electrode 124, and a path of travel from the starting position to the ending position. In embodiments involving the application of solvent, moving the first electrode 124 in multiple passes over the tissue 108 and underlying substrate 112 may be useful for providing additional time for the paraffin to interact with (e.g., mix with or diffuse into) the solvent.

In an embodiment, the solvent may be applied in two or more separate steps or iterations, i.e. at two or more different times. For example, an aliquot of solvent may be added before initiating application of the electric field, and an additional aliquot of solvent may be added after initiating application of the electric field. As another example, separate aliquots of solvent may be added between separate passes of the first electrode 124 over the tissue 108.

The conventional process for tissue deparaffinization using xylene is time consuming, typically requiring at least two five-minute xylene washes. By comparison, the method disclosed herein may require only one minute or less for tissue deparaffinization. As one non-exclusive example, the method disclosed herein may perform three passes of the first electrode 124 across (over) the tissue 108 at a rate of, for example, about 5 mm/s, whereby the deparaffinization process is completed in around one minute. Moreover, the deparaffinization process may be sped up further by employing a solvent as described above. As one non-exclusive example, when the method disclosed herein entails the application of both the electric field and a solvent, only a single pass of the first electrode 124 may need to be performed, and possibly at a faster rate of movement (e.g., greater than 5 mm/s), to achieve effective deparaffinization, such that the deparaffinization process is completed in around five seconds. Accordingly, by this example, the method disclosed herein may reduce the processing time required for deparaffinization by a factor as great as 120 in comparison to the conventional xylene-based process. In addition to or as an alternative to applying solvent, heat energy may be applied as described herein to (further) speed up the deparaffinization process and/or minimize the amount of solvent utilized.

After the paraffin has been removed from the tissue 108, a staining process may be performed on the tissue 108. For example, the tissue 108 may be stained with a standard staining agent such as hematoxylin and eosin (H&E), or an immunohistochemical (IHC) staining agent or other special staining agent. Other desired processes may be performed on the tissue 108. For example, nucleic acids may be isolated from the tissue 108 and subjected to further processing such as, for example, amplification by polymerase chain reaction (PCR), hybridization, etc.

FIGS. 5A-4D illustrate an example of utilizing an electric field to remove paraffin from a vertically oriented paraffin-embedded tissue sample. FIGS. 5A-4D are sequentially taken photographs showing a side perspective view of an example of a tissue sample, namely a paraffin-embedded tissue 508 disposed on a glass side 512, supported on a grounded hotplate 548. In this example, the tissue 508 and the hotplate 548 were oriented vertically. The hotplate 548 was heated to 65° C. A voltage potential of −20 kV was applied to a pin-shaped first electrode 524 (visible in FIGS. 5C and 5D). The first electrode 524 was moved in a downward direction along the length of the glass side 512, generally in alignment with the longitudinal centerline of the glass side 512, while maintaining a gap of about 20 mm between the tip of the first electrode 524 and the tissue 508/glass side 512. FIG. 5A shows the tissue sample before application of the electric field. FIG. 5B shows the tissue sample after initiation of the electric field. FIG. 5B shows the development of a semi-circular front of paraffin 568 in response to the electric field. FIGS. 5C and 5D show the first electrode 524 being moved downward at a speed of about 5 mm/s. It is observed that the front of paraffin 568 moves downward along with the first electrode 524, eventually leaving the tissue 508. FIGS. 5A-5D thus illustrate an example of utilizing both heat energy and a vertical orientation of the tissue sample to assist in the removal of the paraffin 568 from the tissue 508.

Figures 6A, 6B, 6C, 6D:
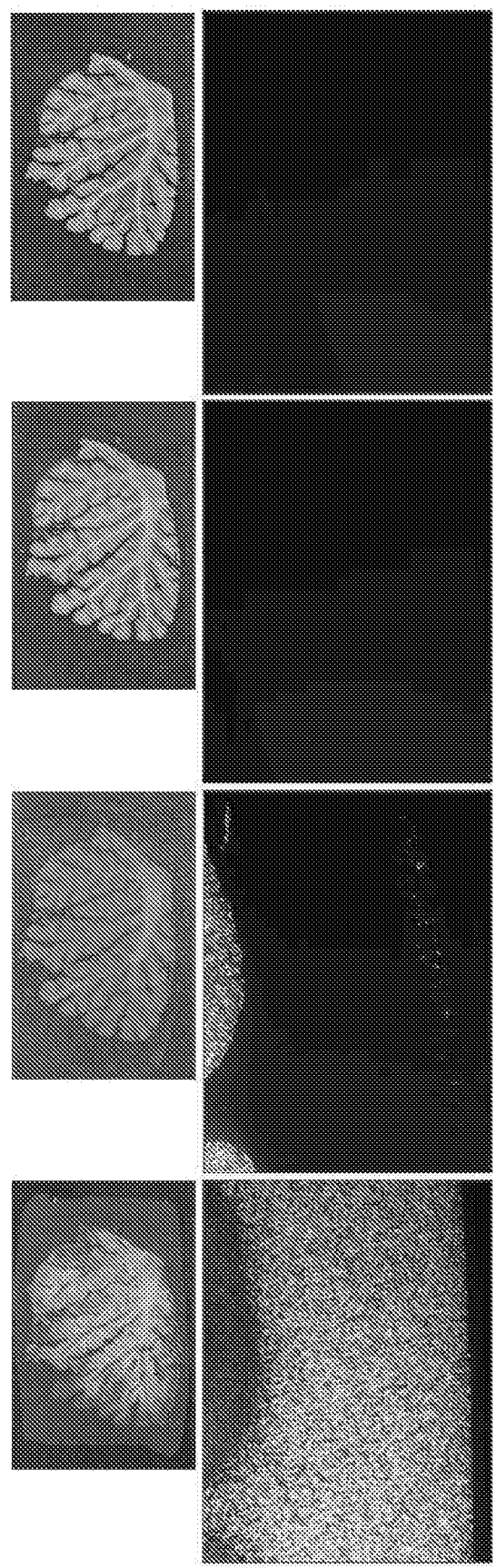
FIG. 6A is a bright-field image and a polarized image of a tissue sample without any type of paraffin removal performed.
FIG. 6B is a bright-field image and a polarized image of a tissue sample after treatment with an electric field according to an embodiment disclosed herein.
FIG. 6C is a bright-field image and a polarized image of a tissue sample after treatment with xylene in the conventional manner.
FIG. 6D is a bright-field image and a polarized image of a tissue sample after treatment with both an electric field and a solvent according to an embodiment disclosed herein.

FIGS. 6A-6D are a set of microscope-acquired images of similar sections cut from a tissue sample, providing a comparison between the conventional xylene-based method for removing paraffin from paraffin-embedded tissue and methods disclosed herein. In each of FIGS. 6A-6D, the top image is a bright-field image of a tissue sample and the bottom image is a polarized image of a tissue sample. Generally, the brighter the image, the more paraffin remained after implementation of the method. FIG. 6A is a bright-field image and a polarized image of a tissue sample without any type of deparaffinization technique performed. FIG. 6B is a bright-field image and a polarized image of a tissue sample after treatment with an electric field according to an embodiment disclosed herein. FIG. 6B indicates that a residual amount of paraffin remained in/on the tissue after the electric field treatment. FIG. 6C is a bright-field image and a polarized image of a tissue sample after treatment with xylene in the conventional manner. FIG. 6D is a bright-field image and a polarized image of a tissue sample after treatment with both an electric field and a solvent (Clearify®™ clearing agent in this example) according to an embodiment disclosed herein. FIGS. 6C and 6D indicate that treatment with both the electric field and a small amount of solvent as disclosed herein, as well as the conventional xylene treatment, are able to remove all (or substantially all) paraffin from the tissue. FIGS. 6A-6D demonstrate that the methods described herein are a suitable alternative to the conventional xylene treatment.

From the foregoing, it is evident that the tissue preparation apparatus 100 and its method of use may provide a number of advantages. As noted above in the background section of this disclosure, after paraffin-embedded tissue has been sectioned into thin slices, the resulting tissue sections conventionally undergo a critical drying process that ensures the tissue sections are fully adhered to the slides (i.e., solid substrates 112) and thereby will not be lost during subsequent handling or processing. The conventional drying process may take an hour or so to complete. By comparison, the tissue preparation apparatus 100 is effective in removing water from the tissue as well as paraffin. The tissue preparation apparatus 100 allows better adhesion to both non-charged and charged slides than the conventional drying process. Thus, the conventional drying process may be eliminated, which consequently may save nearly an hour or so from the total processing time of the tissue. Accordingly, the tissue preparation apparatus 100 is effective for minimizing drying time while achieving tissue adhesion to the slide.

As also noted above, after drying the tissue and before initiating the staining process, the paraffin must be removed from the tissue, which conventionally is performed by dipping the tissue slide in xylene to dissolve the paraffin. By contrast, the electric field-based deparaffinization process of the present disclosure is able to remove most or all of the paraffin without the use of xylene, which is highly desirable given that xylene is a highly toxic chemical. Moreover, the electric field-based deparaffinization process is a faster process than the xylene-based process, as noted above.

Moreover, the electric field-based deparaffinization process of the present disclosure has been found to be compatible with not only standard hematoxylin and eosin (H&E) staining, but also antigen retrieval and staining for immunohistochemistry (IHC).

Furthermore, because xylene-based deparaffinization is minimized or eliminated and accordingly a cause of oxidative damage to guanosine nucleotides is minimized or eliminated, the electric field-based deparaffinization process of the present disclosure may enable and promote the ability to extract nucleic acids (DNA and RNA) of superior quality from tissues. Since tumor tissue may comprise only a portion of a section and only the tumor portion is typically selected for subsequent genomic analysis, multiple sections are routinely cut to obtain sufficient material. The electric field-based deparaffinization process may allow thicker sections to be cut and sufficiently cleared of paraffin to be compatible with genomic analysis kits.

Paraffin removal as described herein may conveniently be carried out under ambient conditions. Ambient air may be utilized as a plasma-forming gas mixture. That is, the plasma utilized may be an air plasma. In other embodiments, the plasma-forming process may be enhanced by providing a flow of one or more specific plasma-forming gases to the ionization (plasma-forming) region in the vicinity of the first electrode. Examples of specific plasma-forming gases include, but are not limited to, diatomic oxygen ($O_2$), diatomic nitrogen ($N_2$), a noble gas such as argon (Ar), etc. A specific plasma-forming gas may be provided by nozzles configured to direct the gas to the ionization region where the gas can be excited by the applied electric field. Alternatively, the apparatus 100 and the tissue 108 may be positioned in an enclosure (chamber) that provides a controlled environment (relative to the ambient), and the plasma-forming gas may be flowed into the enclosure. The use of specific plasma-forming gas(es) to modify the composition of the air in the ionization region, or instead or air, may be desired for tuning the conditions (e.g., voltage parameters) under which plasma is generated and sustained, as needed for optimizing the ionization process and/or the paraffin-removal process.

Thus far, the mechanism or technique of ionization has been described primarily in the context of a corona discharge-type plasma. The presently disclosed subject matter in its broader aspects, however, is not limited to any specific mechanism of ionization. More generally, any type of ionization suitable for the process of paraffin removal may be utilized. Typically, atmospheric-pressure ionization (API) techniques are contemplated as they do not require operating in an evacuated environment. In addition to corona discharge ionization, other examples of API techniques include, but are not limited to, atmospheric-pressure plasma-based ionization, atmospheric-pressure chemical ionization (APCI), atmospheric-pressure photoionization (APPI) (e.g., using a laser, ultraviolet lamp, etc.), inductively coupled plasma (ICP) ionization, microwave induced plasma (MIP) ionization, dielectric barrier discharge (DBD) plasma ionization, etc. Alternatively, ionization in a vacuum regime may be carried out if the apparatus 100 and the tissue 108 are positioned in an appropriately configured vacuum chamber. Examples ionization techniques performed in vacuum include, but are not limited to, glow discharge (GD) ionization, electron ionization (EI) using a filament for thermionic emission, and chemical ionization (CI) using a filament for thermionic emission.

Figure 7:
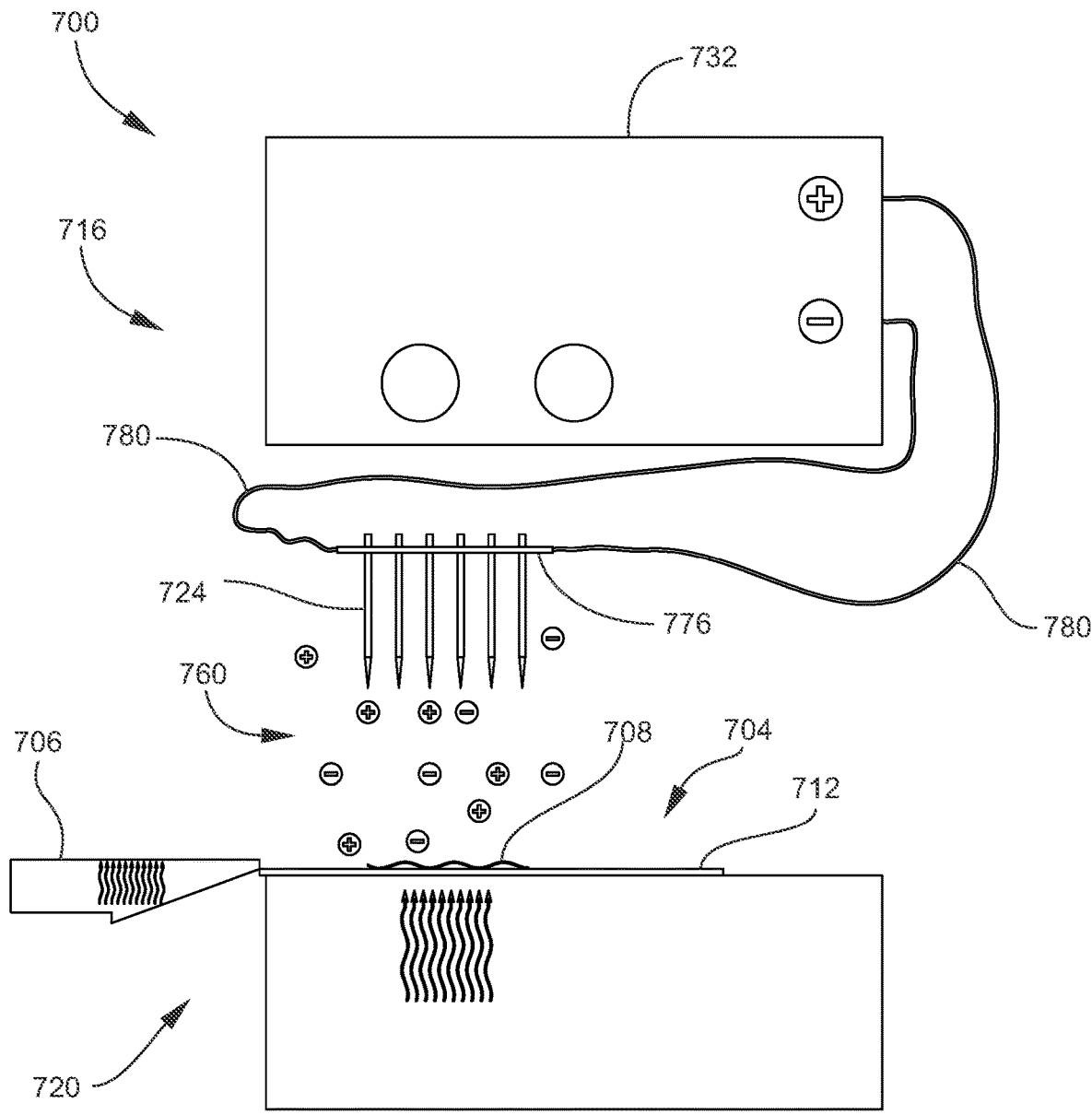
FIG. 7 is a schematic view of an example of a tissue preparation apparatus according to another embodiment disclosed herein.

FIG. 7 is a schematic view of an example of a tissue preparation apparatus 700 according to another embodiment. Similar to the embodiment described above and illustrated in FIGS. 1 and 4, the apparatus 700 includes an electric field-generating device 716 and a support structure 720 configured to support a tissue arrangement 704 (paraffin-impregnated tissue 708 on, for example, a microscope slide 712). In some embodiments, the support structure 720 is or includes a heating device as described herein. In the present embodiment, the electric field-generating device 716 includes a plurality of first electrodes 724. The first electrodes 724 may be arranged in a one-dimensional or two-dimensional array. The first electrodes 724 may be spaced from each other by a fixed distance (or pitch). The first electrodes 724 may be (removably) mounted to an appropriately configured electrode support 776 that determines the positions and spacing of the first electrodes 724 relative to each other. In some embodiments, the electrode support 776 may be electrically conductive to minimize the amount of electrical wiring 780 needed between the first electrodes 724 and a voltage source (electrical power supply) 732. The first electrodes 724 may be movable to enable controlled movement of the electric field relative to the tissue 708 as described herein. The electric field-generating device 716 may further include electrically insulating and/or thermally insulating structures (not shown) attached to or otherwise mechanically referenced to the electrode support 776 and/or the first electrodes 724 as needed to facilitate manual or automated movement of the first electrodes 724 across the tissue 708. For example, electrically insulating and/or thermally insulating structures may be provided in the form of a user-graspable handle or a fixture configured for coupling to a motorized stage or robot. Also in the illustrated example, the voltage source 732 is provided in a control console that includes components such as user-operated control knobs for adjusting voltage, or both voltage and frequency in the case of an AC voltage source, as described herein.

The multiple first electrodes 724 may be useful for increasing the overall size or footprint of the active region of plasma 760 generated by the electric field-generating device 716. In this case, the plasma 760 may be shaped as a wide curtain. The apparatus 700 may otherwise generally be configured and operated similarly to the apparatus 100 described above and illustrated in FIGS. 1 and 4.

One or more second electrodes (not specifically shown) utilized as a counter-electrode or ground electrode may be disposed on or integrated with the support structure 720, or otherwise positioned proximate to the tissue 708.

As further shown in FIG. 7, the apparatus 700 (or any of the other embodiments of the tissue preparation apparatus disclosed herein) may include a paraffin collection device 706 utilized to collect the paraffin as it is removed from the tissue 708. The paraffin collection device 706 may be movable, or its position adjustable, relative to the upper (outer) surface of the support structure 720. In some embodiments, the paraffin collection device 706 may be composed of a thermally conductive material and in operation may be heated to assist in the paraffin removal. Accordingly, in an embodiment in which the support structure 720 is configured as a (main or first) heating device, the paraffin collection device 706 may also be referred to herein as an auxiliary or second heating device. The paraffin collection device 706 may be utilized, for example, to assist in "wicking away" the paraffin as the paraffin is moved ("pushed" or "pulled," or repelled or attracted, as described herein) to one side of the substrate 712 (the left side in FIG. 7). For this purpose, the paraffin collection device 706 may be heated to (operate at) a higher temperature than that of the (optionally heated) surface of the support structure 720 (and the paraffin) to cause the paraffin to readily flow onto the paraffin collection device 706 as the paraffin reaches the end of the substrate 712.

Figure 8:
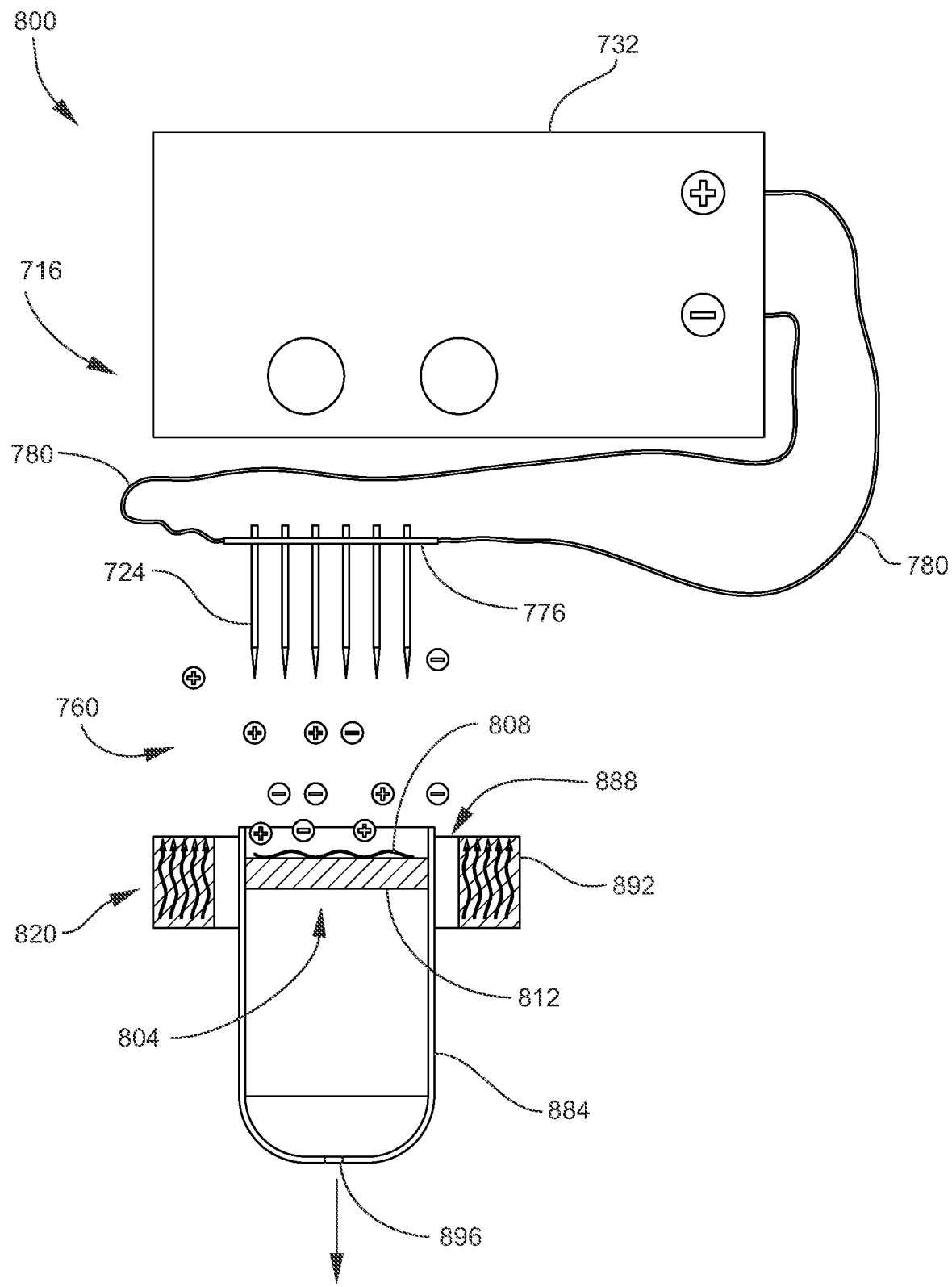
FIG. 8 is a schematic view of an example of a tissue preparation apparatus according to another embodiment disclosed herein.

FIG. 8 is a schematic view of an example of a tissue preparation apparatus 800 according to another embodiment. Similar to other embodiments described herein, the apparatus 800 includes an electric field-generating device 716 and a support structure 820 (with optional heating functionality) near which a supported tissue arrangement 804 is positioned. By way of example, the electric field-generating device 716 with multiple first electrodes 724 described above is also provided in the present embodiment, although any of the other electric field-generating devices described herein may be included in the tissue preparation apparatus 800. In the present embodiment, a paraffin-impregnated tissue 808 is supported on a solid substrate in the form of a porous frit 812, which may be made of glass or other material. For example, the material of the porous frit 812 may be capable of withstanding the heat energy optionally applied during tissue removal. The frit 812 may be removably mounted in a liquid container 884 (e.g., column, vial, test tube, vessel, flask, well of a microtiter plate, etc.) such as at or near the open top of the container 884. The container 884 may be removably mounted in an opening 888 of a container support 892 (e.g., a support plate with one or more openings). The container support 892 may include an array of openings 888 for supporting respective containers 884 and corresponding tissues 808 and frits 812.

In the present embodiment, all or part of the support structure 820 may be integrated with the container support 892. In one embodiment, the support structure 820 may include a plurality of circumferentially spaced (relative to the longitudinal axis of the container support 892) heating elements positioned on or in the container support 892 in close enough proximity to the tissue arrangement 804 to be in thermal contact with the tissue 808. In the present context, the term "in thermal contact" generally may be taken to mean that the heating elements are positioned close enough to the tissue 808 such that when they are activated they establish a thermal gradient effective for transferring an amount of heat to the tissue 808 needed to melt the tissue 808 within a short period of time, for example within a minute or a few minutes.

One or more second electrodes (not specifically shown) utilized as a counter-electrode or ground electrode may be disposed on or integrated with the support structure 820 or the container support 892, or otherwise positioned proximate to the tissue 408.

In the present embodiment, as the paraffin is removed from the tissue 808 by the electric field (which may include moving the first electrodes 724, applying a solvent, and/or applying heat energy as described herein), the paraffin may drain through the holes or pores of the frit 812 and be collected in the container 884. The tissue arrangement 804 (deparaffinized tissue 808 and frit 812) may then be placed in another container for further processing as needed. In some embodiments, the container 884 may include an opening 896 at its base to allow the paraffin to drain out from the container 884.

In another embodiment, the tissue 808 may be disposed directly on a surface of the liquid container 884. In this case, the liquid container 884 serves as the solid support for the tissue 808, and an additional solid support such as a frit 812 is not utilized.

In the embodiments described and illustrated thus far, the tissue (and underlying substrate, if provided) have been depicted primarily as being horizontally oriented. However, the tissue (and underlying solid substrate, if provided) may be oriented vertically (ninety degrees relative to a horizontal reference plane) such as described above and shown in FIGS. 5A-5D, or at any other angle between the horizontal and vertical reference planes (e.g., in a range from zero degrees to ninety degrees relative to a horizontal reference plane). Orienting the tissue vertically at some other angle to the horizontal may enhance paraffin removal through the assistance of gravity.

Various other embodiments of a tissue preparation apparatus encompassed by the present disclosure may include combinations of features from different embodiments described above and illustrated in the Figures.

EXEMPLARY EMBODIMENTS

Exemplary embodiments provided in accordance with the presently disclosed subject matter include, but are not limited to, the following:

1. A method for preparing a tissue, the method comprising: providing a tissue embedded with paraffin; generating an electric field effective to produce plasma and direct charged species of the plasma to the paraffin; and applying the electric field to the tissue, wherein the electric field removes at least some of the paraffin from the tissue by moving the paraffin away from the tissue by electrostatic force.

2. The method of embodiment 1, comprising applying a wetting agent to the tissue, in particular after applying the electric field.

3. The method of embodiment 2, wherein the wetting agent is selected from the group consisting of: water; alcohol; ethanol; and an aqueous buffer.

4. The method of any of the preceding embodiments, comprising applying a solvent to the tissue.

5. The method of embodiment 4, comprising applying the solvent before initiating application of the electric field.

6. The method of embodiment 5, comprising: applying the solvent at room temperature; and while applying the electric field, applying heat energy to the tissue.

7. The method of embodiment 4, comprising applying the solvent after initiating application of the electric field.

8. The method of embodiment 7, wherein application of the electric field is initiated during a first stage, and further comprising: applying heat energy to the tissue during the first stage; ceasing to apply the heat energy after the first stage; and applying the solvent after ceasing to apply the heat energy.

9. The method of embodiment 8, comprising, after applying the solvent, continuing to apply the electric field during a second stage.

10. The method of any of embodiments 4-9, wherein the electric field is effective to direct charged species of the plasma to the solvent, and applying the electric field moves the solvent with the paraffin away from the tissue by electrostatic force.

11. The method of any of embodiments 4-10, wherein the solvent is selected from the group consisting of: a non-polar solvent; and naphtha.

12. The method of any of embodiments 4-11, comprising applying a wetting agent to the tissue.

13. The method of any of the preceding embodiments, wherein applying the electric field comprises moving at least one of the electric field or the tissue relative to the other in a direction that moves the paraffin away from the tissue.

14. The method of any of the preceding embodiments, comprising applying heat energy to the tissue.

15. The method of embodiment 14, wherein applying the heat energy comprises a step selected from the group consisting of: placing the tissue sample on a surface and heating the surface; placing the tissue sample in a chamber and heating the chamber; applying radiant heat energy; applying infrared radiation; applying heat energy effective to melt the paraffin; applying heat energy effective to heat the paraffin to a temperature in a range from about 35° C. to about 70° C.; and a combination of two or more of the foregoing.

16. The method of embodiment 14 or 15, comprising applying the heat energy while applying the electric field.

17. The method of any of the preceding embodiments, wherein the plasma is produced from air.

18. The method of any of the preceding embodiments, comprising placing the tissue in a chamber, wherein the plasma is produced from a gas in the chamber.

19. The method of any of the preceding embodiments, wherein generating the electric field comprises applying a voltage between a first electrode and a second electrode.

20. The method of embodiment 19, wherein the plasma is a corona discharge produced in a region surrounding the first electrode.

21. The method of embodiment 19 or 20, wherein the first electrode comprises a feature selected from the group consisting of: a curved feature configured to generate a region of elevated electric field strength surrounding the curved feature; a sharp edge; and a sharp tip.

22. The method of any of embodiments 19-21, wherein applying the electric field comprises positioning the first electrode such that a distal end of the first electrode is at a distance from the tissue, wherein the distance is in a range from about 1 mm to about 50 mm.

23. The method of any of embodiments 19-22, wherein the first electrode comprises an array of electrodes.

24. The method of any of embodiments 19-23, wherein the second electrode is a planar electrode.

25. The method of any of embodiments 19-24, wherein the second electrode is at electrical ground relative to the first electrode.

26. The method of any of embodiments 19-25, wherein providing the tissue comprises placing the tissue on a solid substrate and positioning the solid substrate on the second electrode.

27. The method of embodiment 26, comprising applying heat energy to the tissue by heating the second electrode.

28. The method of any of embodiments 19-27, wherein providing the tissue comprises positioning the tissue between the first electrode and the second electrode.

29. The method of any of embodiments 19-28, wherein applying the electric field comprises moving at least one of the first electrode or the tissue relative to the other.

30. The method of embodiment 29, wherein the first electrode and the tissue are separated by a distance, and moving comprises moving at least one of the first electrode or the tissue toward the other to decrease the distance.

31. The method of embodiment 29 or 30, wherein moving comprises moving at least one of the first electrode or the tissue in a direction parallel to the tissue.

32. The method of any of embodiments 29-30, wherein moving comprises moving the first electrode in a direction parallel to the tissue, in a first pass from a starting position to an ending position, and moving the first electrode in one or more additional passes from the starting position to the ending position.

33. The method of any of embodiments 29-32, comprising, while moving at least one of the first electrode or the tissue relative to the other, maintaining a tip of the first electrode at a distance from the tissue, wherein the distance is in a range from about 1 mm to about 50 mm.

34. The method of any of the preceding embodiments, wherein providing the tissue comprises a step selected from the group consisting of: placing the tissue on a solid substrate; placing the tissue on a slide; placing the tissue on a plate; placing the tissue on a bead; placing the tissue on a porous medium; placing the tissue on a filter; and placing the tissue in or above a liquid container.

35. The method of any of embodiments 1-33, wherein providing the tissue comprises positioning the tissue in or above a container, and further comprising collecting in the container the paraffin removed from the tissue.

36. The method of any of the preceding embodiments, comprising generating the electric field at a voltage having an absolute value in a range from about 1000 V to about 30,000 V.

37. The method of any of the preceding embodiments, wherein, after applying the electric field, the paraffin is substantially free of paraffin.

38. The method of any of the preceding embodiments, wherein, after applying the electric field, the tissue is greater than 98% free of paraffin.

39. The method of any of the preceding embodiments, wherein, after applying the electric field, the tissue contains residual paraffin, and the residual paraffin is less than 2% of the paraffin originally contained in the tissue prior to the removing.

40. The method of any of the preceding embodiments, wherein applying the electric field dries the tissue to improve adhesion of the tissue to an underlying substrate.

41. The method of any of the preceding embodiments, comprising staining the tissue after removing the paraffin.

42. The method of embodiment 41, wherein staining the tissue comprises staining with a staining agent selected from the group consisting of: hematoxylin and eosin (H&E); and an immunohistochemical staining agent.

43. The method of any of the preceding embodiments, comprising isolating nucleic acids from the tissue after removing the paraffin.

44. The method of any of embodiments 13-43, wherein the paraffin is removed from the tissue without adding any liquid to the tissue.

45. A tissue preparation apparatus, comprising: a support structure configured to support a tissue embedded with paraffin; and an electric field-generating device comprising a voltage source, a first electrode configured to be coupled to the voltage source, and a second electrode, wherein: the electric field-generating device is configured to generate an electric field between the first electrode and the second electrode; and the electric field is effective to produce plasma, direct charged species of the plasma to the paraffin, and move the paraffin away from the tissue by electrostatic force.

46. The tissue preparation apparatus of embodiment 45, wherein at least one of the first electrode or the support structure is movable relative to the other in a direction that moves the paraffin away from the tissue.

47. The tissue preparation apparatus of embodiment 45 or 46, comprising a liquid dispensing device configured for dispensing a solvent on the tissue.

48. The tissue preparation apparatus of any of embodiments 45-47, comprising a heating device configured for applying heat energy to a tissue.

It will be understood that terms such as "communicate" and "in communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for preparing a tissue, the method comprising:
   providing a tissue embedded with paraffin;
   generating an electric field effective to produce plasma and direct charged species of the plasma to the paraffin;
   applying the electric field to the tissue, wherein the electric field removes at least some of the paraffin from the tissue by moving the paraffin away from the tissue by electrostatic force; and
   adding a wetting agent to the tissue, wherein the wetting agent prevents the tissue from drying out.

2. The method of claim 1, in which greater than 98% of the paraffin is removed.

3. A method for preparing a tissue, the method comprising:
   providing a tissue embedded with paraffin;
   generating an electric field effective to produce plasma and direct charged species of the plasma to the paraffin; and
   applying the electric field to the tissue, wherein the electric field removes at least some of the paraffin from the tissue by moving the paraffin away from the tissue by electrostatic force;
   wherein the tissue contains residual paraffin after the electric field is applied.

4. The method of claim 3, wherein the residual paraffin prevents the tissue from drying out.

5. The method of claim 3, wherein the residual paraffin prevents damage to the tissue from exposure to air.

6. The method of claim 3, wherein the tissue contains less than 2% residual paraffin.

7. The method of claim 1, wherein the tissue contains residual paraffin after the electric field is applied.

8. The method of claim 7, wherein the residual paraffin prevents damage to the tissue from exposure to air.

9. The method of claim 7, further comprising staining the tissue without removing the residual paraffin.

10. The method of claim 7, wherein a majority of the paraffin is removed from the tissue by the applying of the electric field.

11. The method of claim 7, further comprising positioning the tissue embedded with paraffin on an underlying solid substrate.

12. The method of claim 3, further comprising staining the tissue without removing the residual paraffin.

13. The method of claim 3, wherein a majority of the paraffin is removed from the tissue by the applying of the electric field.

14. The method of claim 3, further comprising positioning the tissue embedded with paraffin on an underlying solid substrate.

15. The method of claim 3, wherein the method further comprises adding a wetting agent to the tissue.

* * * * *